(12) United States Patent
Hewett et al.

(10) Patent No.: US 11,999,534 B2
(45) Date of Patent: Jun. 4, 2024

(54) COMPOSITE CLOSURE HAVING IMPROVED SEAL

(71) Applicant: Silgan White Cap LLC, Downers Grove, IL (US)

(72) Inventors: Mark Hewett, Downers Grove, IL (US); Dennis Szczesniak, Lemont, IL (US); William J. Kapolas, Goodyear, AZ (US); Darren Neputy, Palos Hills, IL (US); Tian Liang, Aurora, IL (US); Dustin Vance, Lombard, IL (US)

(73) Assignee: Silgan White Cap LLC, Downers Grove, IL (US)

(*) Notice: Subject to any disclaimer, the term of this patent is extended or adjusted under 35 U.S.C. 154(b) by 25 days.

(21) Appl. No.: 17/689,395

(22) Filed: Mar. 8, 2022

(65) Prior Publication Data

US 2022/0267054 A1 Aug. 25, 2022

Related U.S. Application Data

(63) Continuation of application No. PCT/US2022/017220, filed on Feb. 22, 2022.
(Continued)

(51) Int. Cl.
*B65D 43/02* (2006.01)
*B65D 53/02* (2006.01)
*F16J 15/10* (2006.01)

(52) U.S. Cl.
CPC ......... *B65D 43/0283* (2013.01); *B65D 53/02* (2013.01); *F16J 15/10* (2013.01);
(Continued)

(58) Field of Classification Search
CPC ............... B65D 43/0283; B65D 53/02; B65D 2401/15; B65D 2543/00092;
(Continued)

(56) References Cited

U.S. PATENT DOCUMENTS 4,121,729 A 10/1978 Husum
4,473,163 A 9/1984 Geiger
(Continued)

FOREIGN PATENT DOCUMENTS

JP 2014-177291 9/2014

OTHER PUBLICATIONS

International Search Report and Written Opinion for International Application No. PCT/US2022/017220, dated Jun. 10, 2022, 11 pages.

*Primary Examiner* — Shawn M Braden
(74) *Attorney, Agent, or Firm* — Reinhart Boerner Van Deuren s.c.

(57) ABSTRACT

A composite closure which includes an improved sealing gasket material and shape. The Closure includes an end panel that is received in a circular plastic fitment having a central opening therein defined by an inwardly extending flange which over-lies in an outer periphery of the end panel and an integral skirt downwardly depending from the flange. The fitment includes an inwardly extending circumferential bead or bead segments which include a substantially non-deformable flat vertical surfaces that are substantially parallel to the axis of the closure and axially positioned to contact the radial outer-most edge of the end panel when the closure is fully applied to a container. The sealing gasket has the shape of an annulus with a particular cross-section and formed from a PVC free material.

17 Claims, 28 Drawing Sheets

Related U.S. Application Data

(60) Provisional application No. 63/152,514, filed on Feb. 23, 2021.

(52) U.S. Cl.
CPC .................. *B65D 2401/15* (2020.05); *B65D 2543/00092* (2013.01); *B65D 2543/00314* (2013.01)

(58) Field of Classification Search
CPC ........ B65D 2543/00314; B65D 45/325; B65D 2401/30; F16J 15/10
See application file for complete search history.

(56) References Cited

U.S. PATENT DOCUMENTS

| | | |
|---|---|---|
| 4,629,083 A | 12/1986 | Druitt |
| 4,747,502 A | 5/1988 | Luenser |
| 4,807,770 A | 2/1989 | Barriac |
| 4,978,016 A | 12/1990 | Hayes |
| 5,054,268 A | 10/1991 | Hayes et al. |
| 5,285,913 A | 2/1994 | Morton |
| 6,874,647 B2 | 4/2005 | Bloom et al. |
| 7,611,026 B1 | 11/2009 | Bloom et al. |
| 7,766,178 B2 | 8/2010 | Robinson et al. |
| 7,784,629 B2 | 8/2010 | German et al. |
| 8,071,004 B2 | 12/2011 | Wan et al. |
| 8,297,458 B2 | 10/2012 | Sumimiya et al. |
| 8,596,477 B2 | 12/2013 | Kras et al. |
| 9,315,306 B2 * | 4/2016 | Taber .................. B65D 51/145 |
| 2004/0149676 A1 | 8/2004 | German et al. |
| 2013/0205718 A1 | 8/2013 | Kapolas |
| 2015/0122769 A1 * | 5/2015 | Taber .................. B65D 51/145 |
| | | 215/350 |
| 2018/0346205 A1 | 12/2018 | Szczesniak et al. |

* cited by examiner

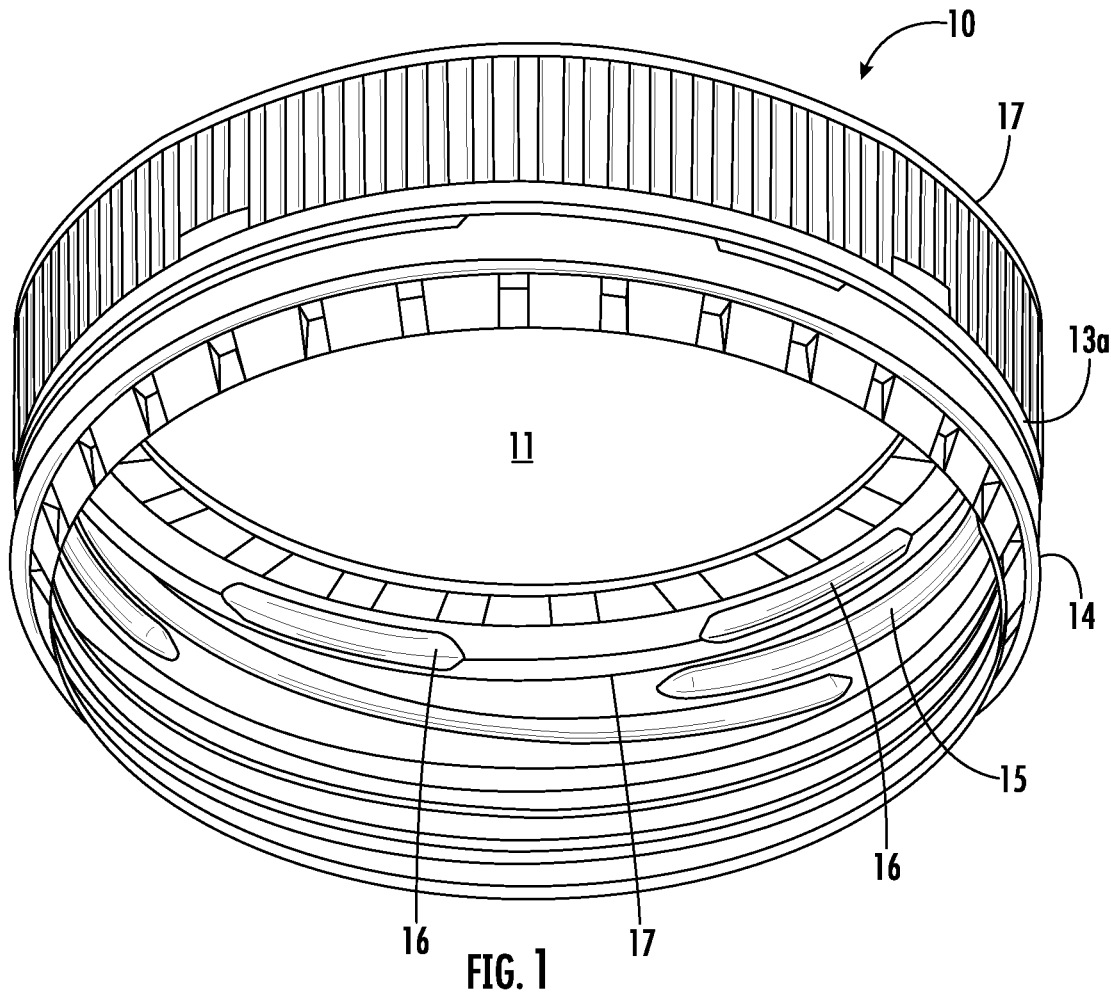
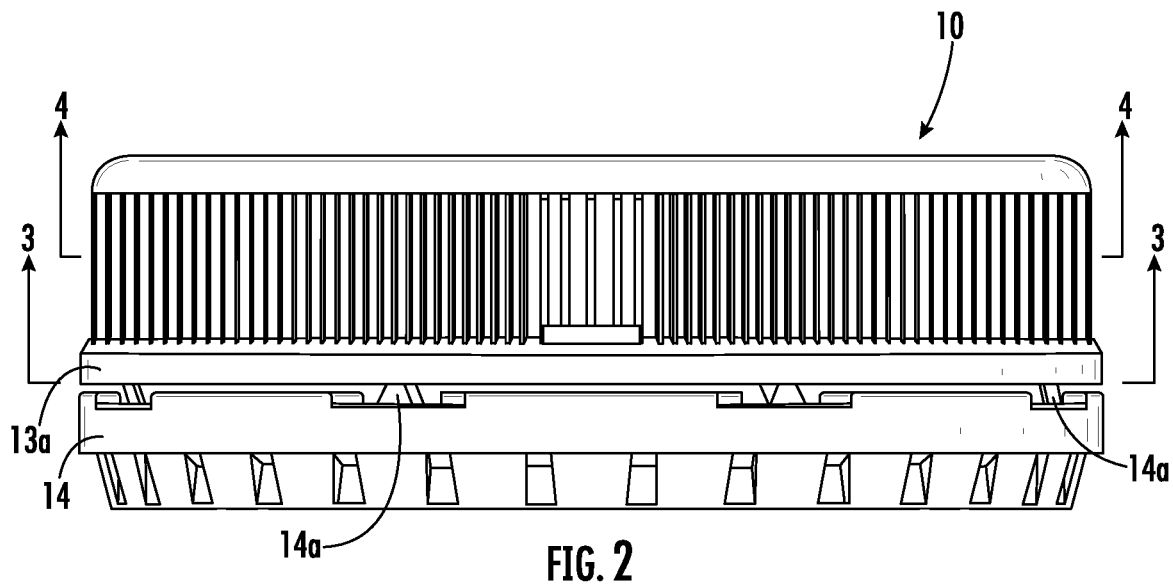

— 1 —

COMPOSITE CLOSURE HAVING IMPROVED SEAL

CROSS-REFERENCE TO RELATED PATENT APPLICATIONS

The present application is a continuation of International Application No. PCT/US2022/017220, filed Feb. 22, 2022, which claims the benefit of and priority to U.S. Provisional Application No. 63/152,514, filed on Feb. 23, 2021, each of which is incorporated herein by reference in its entirety.

BACKGROUND OF THE INVENTION

The present invention generally relates to composite closures and, more particularly, to composite closures having a metal or plastic shell or fitment and a metal or plastic end panel having improved opening torque properties and characteristics.

Composite closures are known in the prior art and have been selectively used for products which are cold filled, hot filled or thermally pasteurized or sterilized after filling and closing. Typically, these closures include a metal top panel which can be pre-lined with a suitable sealing material such as, for example, a plastisol gasket material and then inserted or pressed into a preformed plastic (e.g., polypropylene) fitment or shell. A tamper indicating band, typically formed of a plastic material, is commonly secured to the lower portion of the skirt.

Due to concerns relating to the type of gasket material used in these prior closures, substantial resources have been and are required to develop a closure utilizing a different gasket material than has been used in the past. Attempting to replace such gasket material is difficult and complicated because many factors must be considered in making this change. Such factors include, but are not limited to: the requirement to reduce or avoid toxic chemicals in the material, the requirement to maintain long term sealing properties of the material, the ability to use existing manufacturing equipment with different gasket materials, the constraints on modifying the shape of gaskets to accommodate a new material, the inability to thermal cycle many gasket materials during food processing, the type of food or beverage with which the closure will be used, the friction force generated between the gasket and the neck finish of an associated container which affects the opening torque.

SUMMARY OF THE INVENTION

The present disclosure is directed to an improved composite closure which includes a circular plastic shell having a central opening defined by an inwardly extending circumferential flange. A metal or plastic end panel is received in the shell, the upper outer peripheral surface of which is in intimate contact with the flange when the composite closure is fully applied to a container. The plastic shell includes an inwardly extending circumferential bead or bead segments that include a non-deformable flat vertical surface that is substantially parallel to the axis of the closure and axially positioned for contact with a radial outermost surface of the end panel when the closure is fully applied to the container. The bead or bead segments are sized so that the flat vertical contact surface thereof imparts a controlled radial force that provides a perceptible resistance upon rotation of the closure from its fully applied state which produces a disengagement torque (i.e., separation of the bead from the end panel outer edge) that provides assurance to a user that the composite closure has been properly sealed to the container. Additionally, this controlled radial force applied by the bead or bead segments to the peripheral surface of the end panel provides the closure with an anti-backoff feature. It prevents movement by the fitment with respect to the end panel and movement by the fitment and end panel assembly with respect to the container after the container is sealed and after further processing, if any.

Alternative exemplary embodiments relate to other features and combinations of features as may be generally recited in the claims.

BRIEF DESCRIPTION OF THE DRAWINGS

In describing the preferred examples, reference is made to the accompanying drawing figures wherein like parts have like reference numerals and wherein:

FIG. 1 is a bottom perspective view of a closure cap fitment of the present disclosure, shown without an insert disk.

FIG. 2 is a side elevation view of the closure cap fitment of FIG. 1.

DETAILED DESCRIPTION

Figure 3:
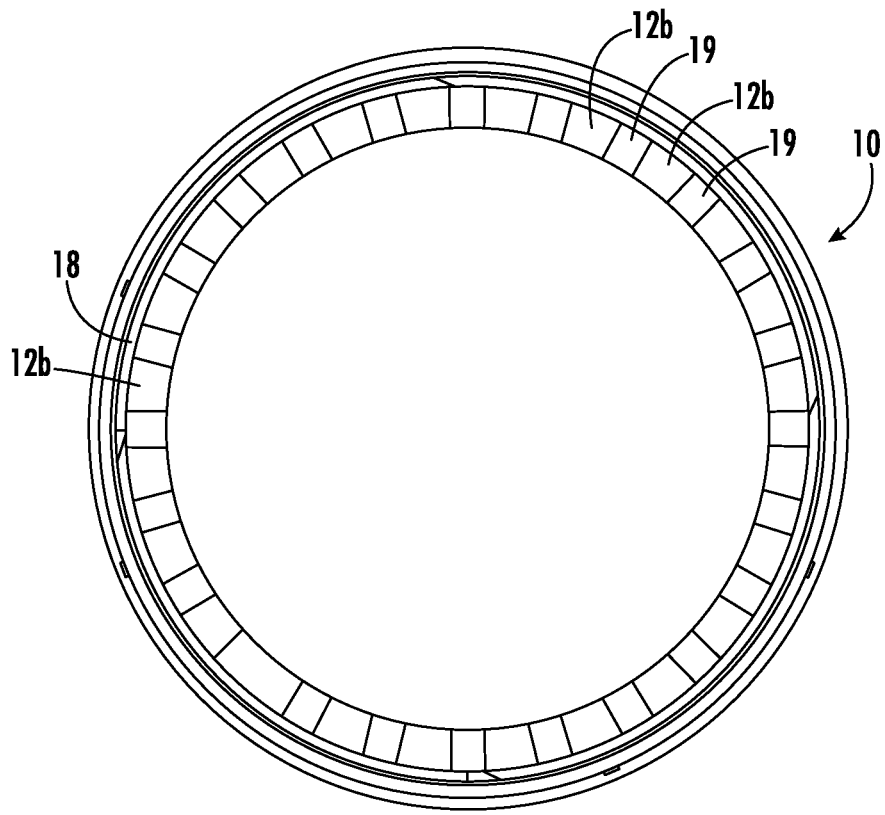
FIG. 3 is a bottom view of the closure cap fitment of FIGS. 1 and 2, shown without the end panel disk, taken along the section line 3-3 of FIG. 2.
Figure 4:
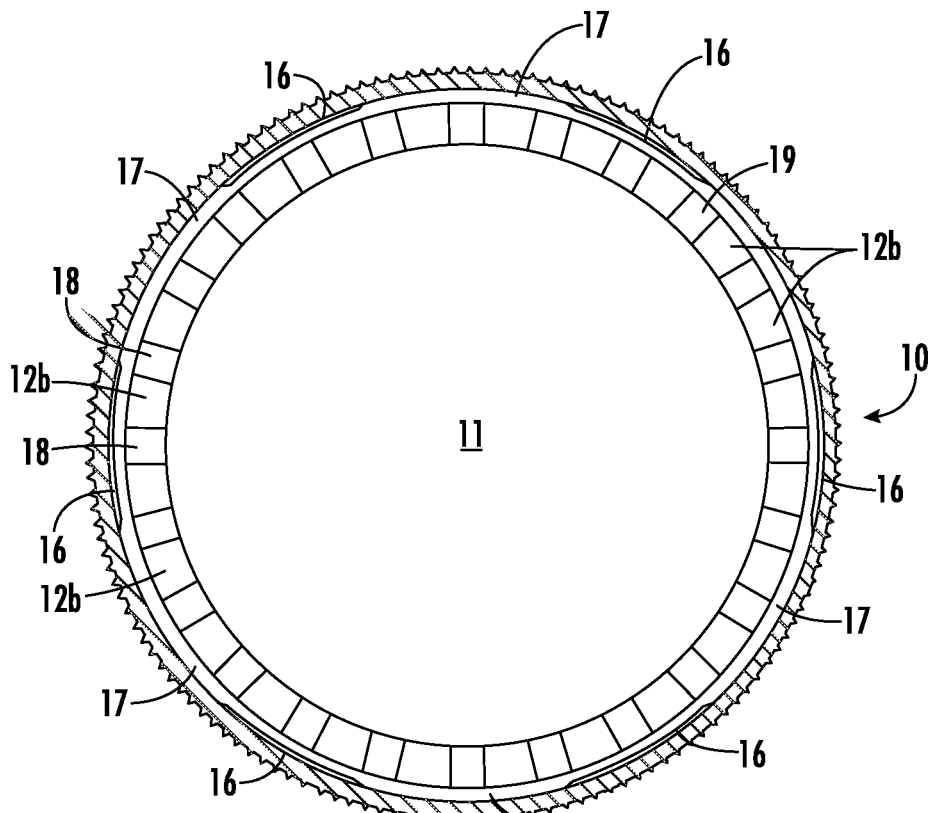
FIG. 4 is a bottom view of the closure cap fitment shown in FIGS. 1 and 2 taken along the line 4-4 of FIG. 2.
Figure 5:
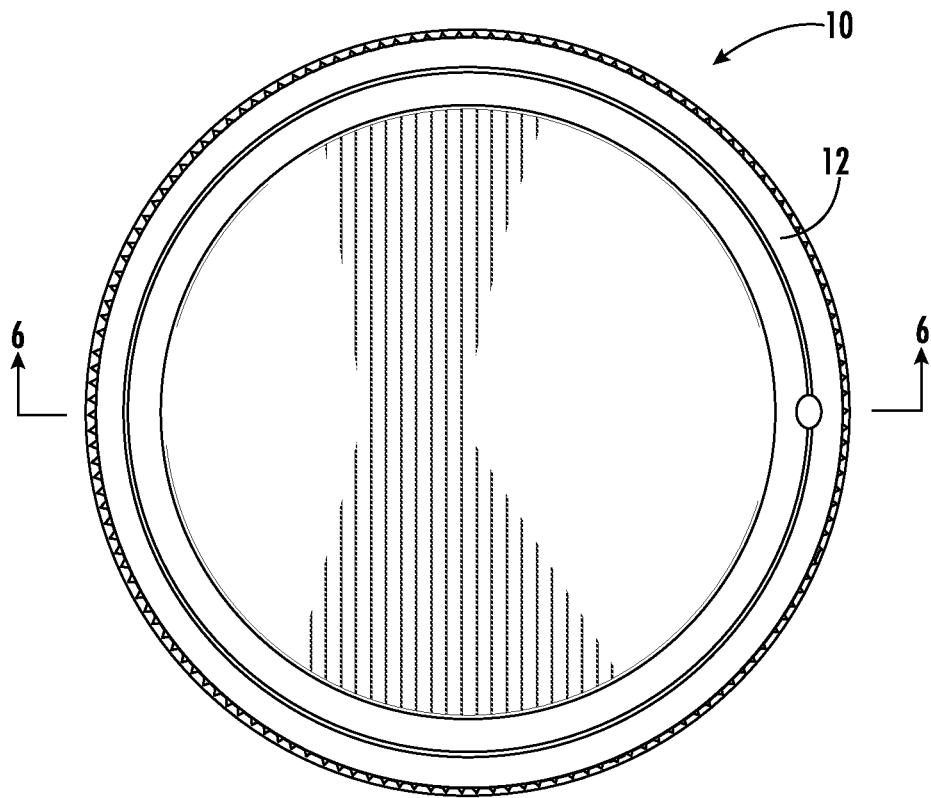
FIG. 5 is a top plan view of the closure cap fitment of FIGS. 1 and 2, shown without the end panel disk insert.
Figure 6:
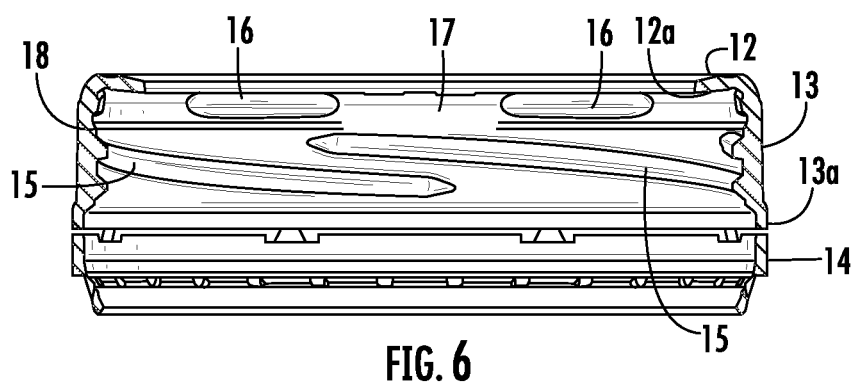
FIG. 6 is a sectional view taken along the line 6-6 of FIG. 5.

Referring to the drawings and, in particular, to FIGS. 1-6, a closure cap fitment of the present disclosure is generally designated by the reference numeral 10. As best shown in FIGS. 1 and 3-6, the fitment includes a central opening 11 defined an inner circumferential edge of a flange 12 that extends into an annular sidewall 13. A tamper indicating band 14 is integrally formed with, and interconnected to, a lower portion 13a of sidewall 13 by a plurality of circumferentially disposed fracturable bridges 14a.

Fitment 10 is fabricated from thermoplastic resins appropriate for the particular application for the associated cap. Such materials may be selected from the group including, for example, propylene homopolymers and copolymers.

The inner circumferential surface of skirt 13 is provided with a plurality of preformed threads 15 for cooperative engagement with the outer threads on a container neck to which the closure will be applied. In the illustrated embodiment, the threads 15 are of a multi-lead design for improved cap application and removal. If desired, however, a single lead thread design could be used.

In accordance with an important aspect of the present disclosure, circumferential bead segments 16 are integrally formed with sidewall 13 and project radially inwardly from the inner surface of the sidewall at a location that is axially above the threads 15 for direct contact with an outermost surface of an end panel that is received within the fitment. In the illustrated embodiment and as best shown in FIGS. 1, 4, 6, 12 and 19 each of six bead segments 16 are separated by circumferential spaces 17. It will be appreciated, however, that the individual separated bead segments 16 could be replaced by a continuous circumferential bead or by a greater or lesser number of bead segments. The use of multiple bead segments which are uniformly spaced around the inner circumference of the skirt 13 serve to provide a substantially uniform, rounded outer circumference of the closure cap sidewall when fully applied to a container. Both a continuous circumferential bead or plurality of equally spaced circumferential bead segments are all characterized by a substantially non-deformable flat vertical surface that is substantially parallel to the axis of the closure fitment.

As shown in FIGS. 3, 4, 6, 12 and 19 the closure cap fitment 10 includes a plurality of spaced, radially extending vents 18 along the bottom surface 12a and flange 12. Vents 18 provide flow channels for draining liquid (water) used to cool or rinse the package are spaced apart by downwardly projecting portions 12b on the undersurface of 12a of flange 12.

Figure 7:
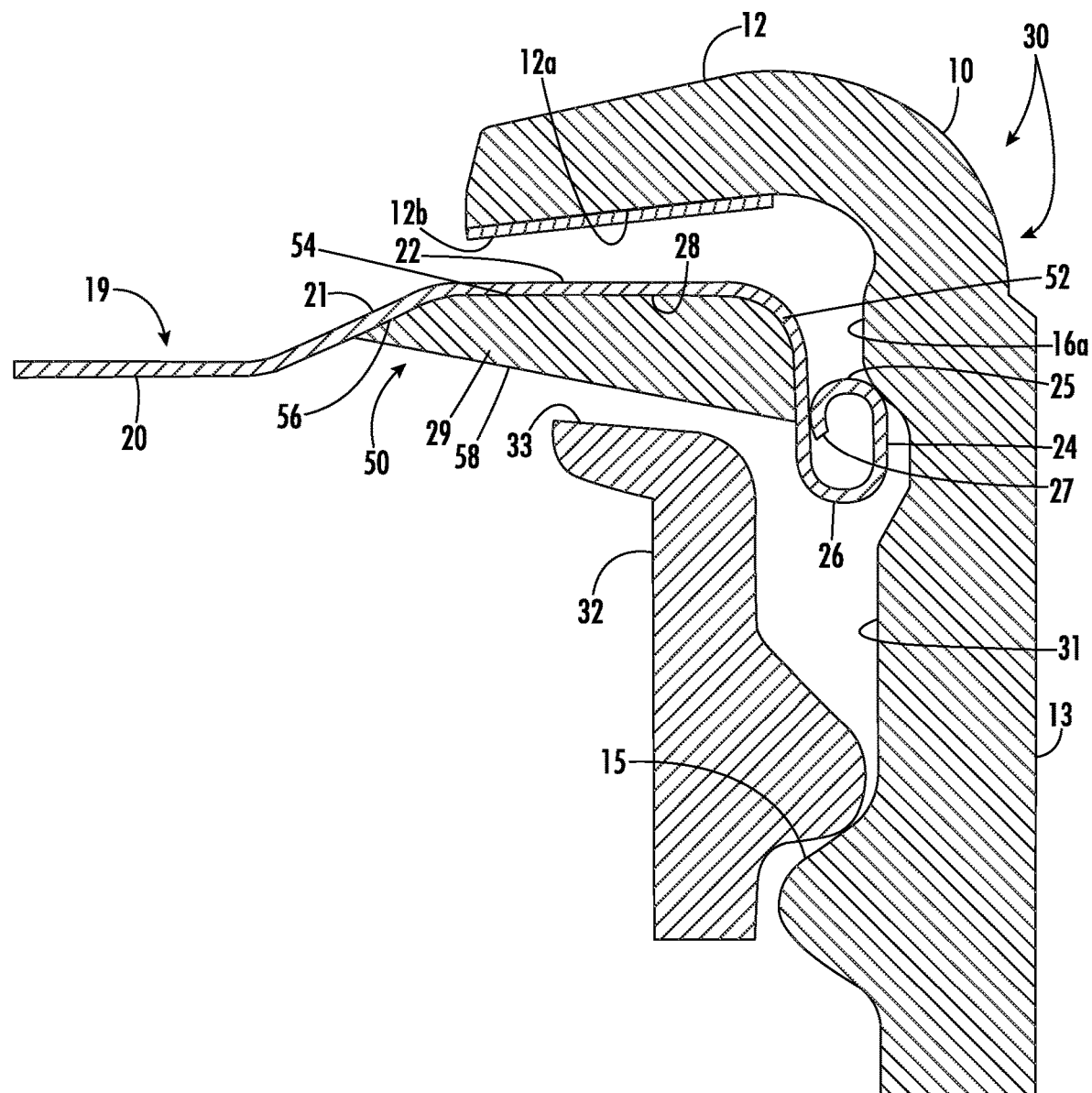
FIG. 7 is a partial longitudinal sectional view of a composite closure cap and container assembly of the present disclosure shown with the end panel in a loose position.
Figure 8:
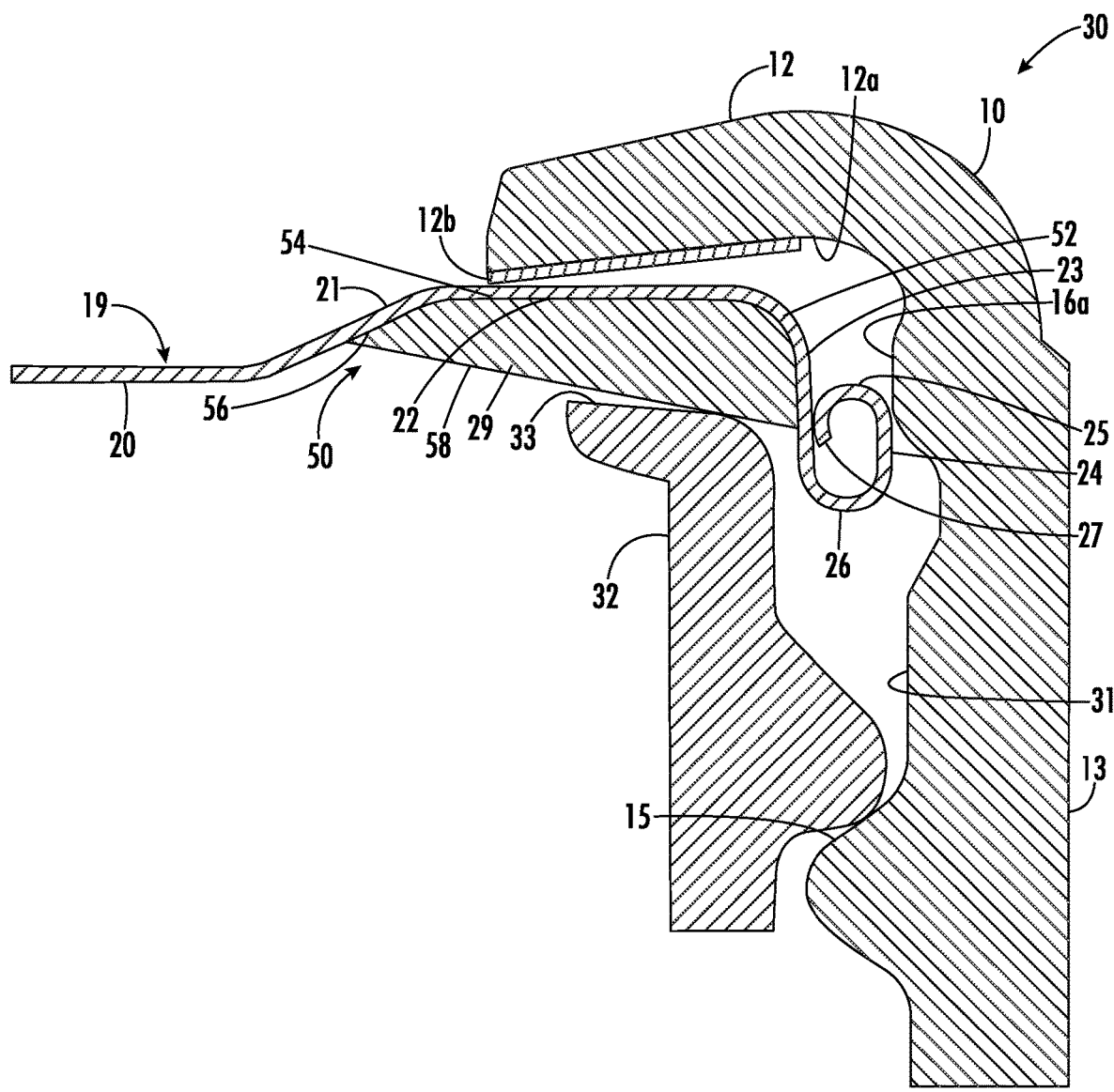
FIG. 8 is a partial longitudinal cross-sectional view of a composite closure cap and container assembly of the present disclosure with the end panel shown in an intermediate position.
Figure 9:
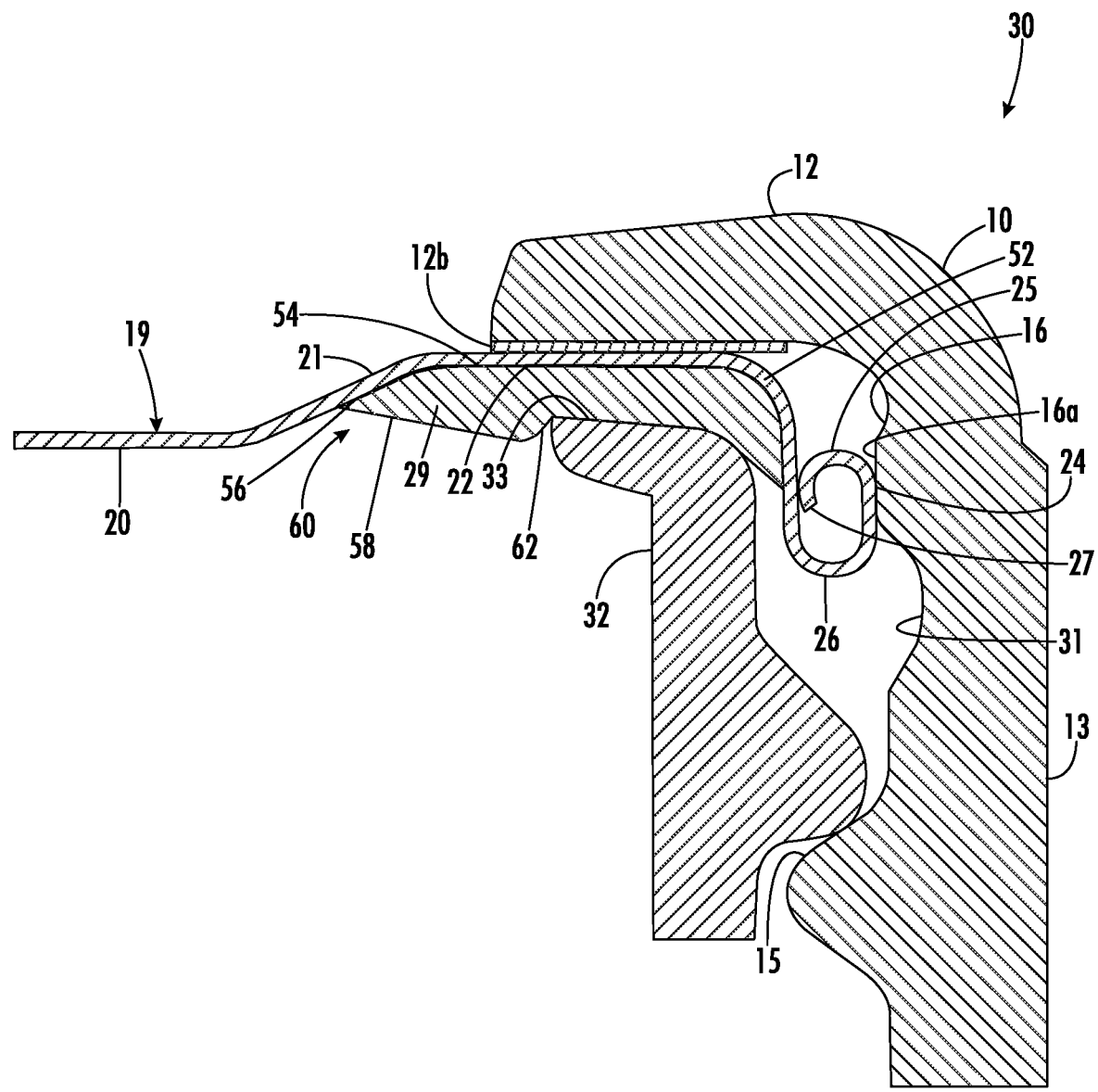
FIG. 9 is a partial longitudinal cross-sectional view of a composite closure cap and container assembly of the present disclosure with the composite closure cap shown in a fully tightened position.

FIGS. 7-9 illustrate a partial view of an end panel 19 in association with the fitment 10 in loose (FIG. 7), intermediate (FIG. 8) and fully tightened (FIG. 9) positions at a representative circumferential location wherein a bead segment 16 is present. Preferably end panel 19 can be formed of metal, however, other materials known in the art exhibiting suitable oxygen barrier properties can also be used. End panel 19 includes a center portion 20 that extends radially outwardly into an upwardly and outwardly inclined surface 21, an annular flat surface 22, and an axially downwardly extending portion 23 that terminates in a curl 24 which includes an upper curved surface 25 and a bottom curved surface 26. As shown, the raw cut edge 27 of the end panel is not exposed. The underside surfaces of sloped portion 21, annular flat portion 22 and axially downwardly extending portion 23 of the end panel define a channel 28 in which a suitable sealing material can be deposited to form a suitable sealing gasket 29 for sealing against an end finish of a container to which the composite closure formed by fitment 10 and end panel 19 (collectively identified by the reference numeral 30) is applied.

A substantial problem with the type of closure described above is the selection of the sealing material and associated shape for sealing gasket 29. As discussed above, there are many considerations for making such a selection and typically these considerations are all interdependent. As a result of toxicity concerns, it is preferable to have sealing gasket 29 formed from a PVC free material. The following are examples of gasket materials which, when combined, with the closure configuration disclosed herein provide a novel closure having a PVC free sealing gasket.

Gasket materials include polyvinyl chloride free resins or non-PVC materials. Non-PVC materials include rubbery block copolymers and their blends with thermoplastic polymers, with this moldable thermoplastic elastomer being especially preferred for its processing advantages. The materials have a Shore A hardness between 30 and 100, preferably 35 to 90, more preferably between 40 and 80, in particular between 45 and 70, and a compression set (measured using a method similar to ASTM D 395-97, method B, under conditions of 70° C., 22 h) between 30% and 95%, preferably between 40% and 85%, more preferably between 50% and 75%, in particular between 50% and 65%.

Example 1: A preferred example includes at least one type of rubbery block copolymer and additionally a thermoplastic polymer, and additionally a resilient thermoplastic polymer. There are also optional additives such as other thermoplastic polymers, lubricants, processing oils, antioxidants, pigments/colorants, and fillers.

Example 2: More specific gasket compositions include those composed of a thermoplastic elastomeric material selected from a moldable-saturated ABA-type block copolymer based on styrene and butadiene such as styrene-ethylene-butylene styrene (SEBS) type block copolymers containing from about 20% to about 40% styrene and about 60% to 80% ethylene-butylene co-monomers.

Example 3: Another preferred thermoplastic elastomer includes EPDM (ethylene-propylene-dicyclopentadiene) elastomers.

Example 4: Gasket materials with a main polymeric component, preferably comprising two different polymers can be used. The properties of this main polymeric component can be suitably modified by the admixture of other components such as other polymers. An olefin block copolymer is useful as a main component for achieving the objective, especially when mixed with a second polymer. As the second polymer, certain random copolymers are suitable, optionally together with, or replaced by, HDPE, (co)-PP or other types of polymers of this kind.

Example 5: The polymer material forming the main component of the gasket is based on certain polyalkylenes, which can be processed without extenders and the like to form gaskets for container closures with diameters of more than 2 cm. It has been found that a block copolymer which is composed of various alkene monomers, selected from ethylene, propene, butene, hexene and, in particular, octene, is particularly well suited for this purpose. The gasket material including a random copolymer, that is formed by a linear or branched interpolymer of ethylene on the one hand and at least one $C_3$-$C_{20}$ alphas-olefin on the other hand. Other formulation variations are possible, wherein the block copolymer is present in the range of 20-100%, the random copolymer is present in the range of 0-80%, and as additional ingredients, other polyolefins, in particular, styrene-ethylene/butylene-styrene (SEBS), HDPE or co-PP with up to 25% are present.

Example 6: An exemplary formulation for use for hot-filling and pasteurization comprises: ethylene-octene block copolymer: 39.1%; ethylene-octene random copolymer: 60%; antioxidant: 0.2%; stabilizer: 0.1%; and lubricant: 0.6%. The polymeric materials can resist hot-filling at up to 100° C. for up to 60 min, starting from a hot-filling of at least 60° C. at a maximum of 10 min and a minimum of 1 min. The hot-filling starting from 60° C. can be accomplished in 60 min to up to 100° C. in increments of 5° C.

Example 7: Thermoplastic elastomers having a viscosity index, as measured on the Brabender Plasticorder, greater than about 40 meter-grams torque, including thermoplastic elastomers having a viscosity index of between about 400 and about 800 meter-grams torque at 175° C. These materials will not demonstrate significant shift in position or shape when deposited within a closure. Hot-melt deposition of these materials within a closure requires high pressures. Pressures of from about 2000 psi to about 5000 psi have been suitable, although pressures in excess of 5000 psi may be required for some materials. For certain gasket applications, it may be desirable to add a blowing agent to the gasket material and prior to dispensing the material as a hot-melt.

As best shown in each of FIGS. 8, 9, 10 and 11, a retaining bead 31 extends radially inwardly from the inner surface of the sidewall 13 serves to retain the end panel in the fitment. Additionally, retaining bead 31 also serves to provide a lifting action on the end panel during removal of a closure cap from a container. If desired, retaining bead 31 can be omitted and the closure 30 with a top surface of the uppermost thread 15 configured such that it both serves to both retain the disk 19 from being inadvertently separated from the fitment 10 prior to application of a composite closure assembly 30 to a container and also to perform the function of lifting the end panel from a sealed end finish of a container to which the composite closure is applied.

The contact beads 16 include a substantially non-deformable flat vertical surface 16a which is parallel to the longitudinal axis of the container and axially positioned so that it is in interference fit contact with the outermost portion of the end panel, i.e., the curl 24 in the embodiment of FIGS. 7-11, the curl 75 in the embodiment of FIGS. 13-18, and the curl 175 in the embodiments of FIGS. 20-31 when the closure is fully applied and tightened as shown in FIG. 9. The contact bead flat surface 16a imparts a limited predetermined radial (without significant axial force on the outwardmost surface of the curl 24) to provide a readily perceptible resistance (e.g., approximately 10 to 30 inch pounds with 63 mm closures) upon initial rotation of the closure from its fully applied and sealed on the container prior to that initial rotation. The contact bead flat surface 16a similarly imparts a limited predetermined radial, without significant axial force on the outwardmost surface of the curls 75 and 175 to provide a readily perceptible resistance upon initial rotation of the closure from its fully applied and sealed on the container prior to that initial rotation.

As shown in FIG. 7, in the loose position, the end panel 19 is schematically depicted in the space between the bottom surface 12a of fitment 10 and end finish 33 of a container 32. In this position, the curl 24 is located below the flat vertical surface 16a of contact bead 16. The intermediate position depicted in FIG. 8 shows the end finish 33 in initial contact with the gasket 29 and the annular flat surface 22 of the end panel 19 in initial contact with the vent-defining portion 12b of flange 12. In this position, the radial outermost portion of curl 24 is in initial contact with the flat vertical surface 16a of contact bead 16. In the fully tightened position, the composite closure 30 is fully seated on the container end finish 33 and the vertical flat surface 16a is in an interference fit with the curl 24, applying a radial force (without any significant axial component) to the curl.

Referring more specifically to the shape of sealing gasket 29, FIGS. 7-18 illustrate a number of embodiments of gasket 29 cross-sectional shapes. The overall shape of gasket 29 can be described as circular and more particularly as an annulus with a particular cross-section. These cross-sections in both compressed and un-compressed conditions are described below in reference to FIGS. 7-11, 13-18 and 20-31.

FIGS. 7-10 show gasket 29 having a first cross-sectional shape 50. FIGS. 7-8 depict un-compressed cross-sectional shape 50. Un-compressed cross-sectional shape 50 includes an upper curved edge 52 that extends into a generally horizontal edge 54 defined by annular flat surface 22, that extends into an upward sloped edge 56 defined by sloped portion 21, that extends into a downward sloped edge 58 that connects back to upper curved edge 52.

Figure 10:
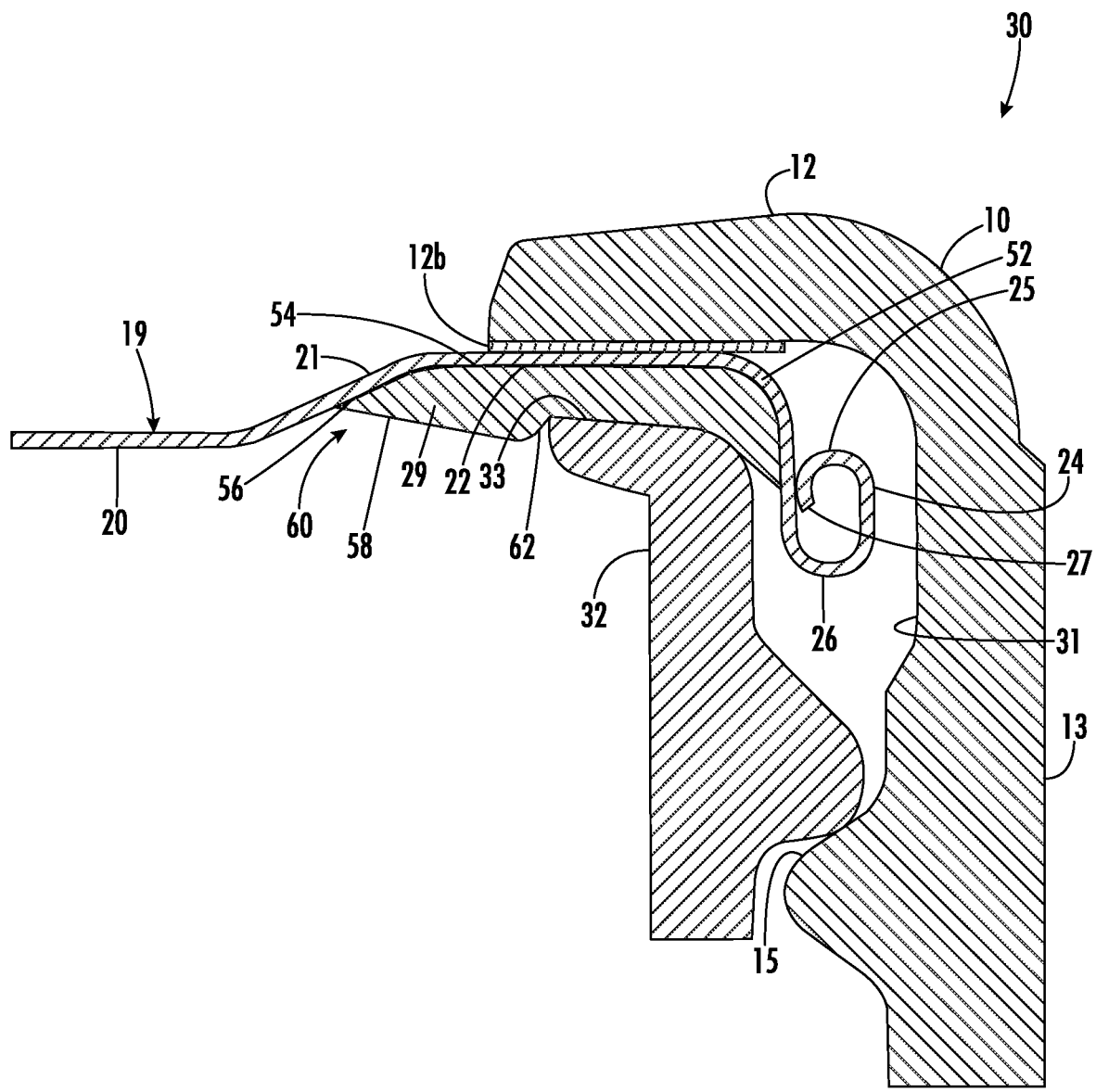
FIG. 10 is a partial longitudinal sectional view of a composite closure and container assembly of the present disclosure with the composite closure shown in a fully tightened position at a circumferential location between adjacent individual bead segments.
Figure 11:
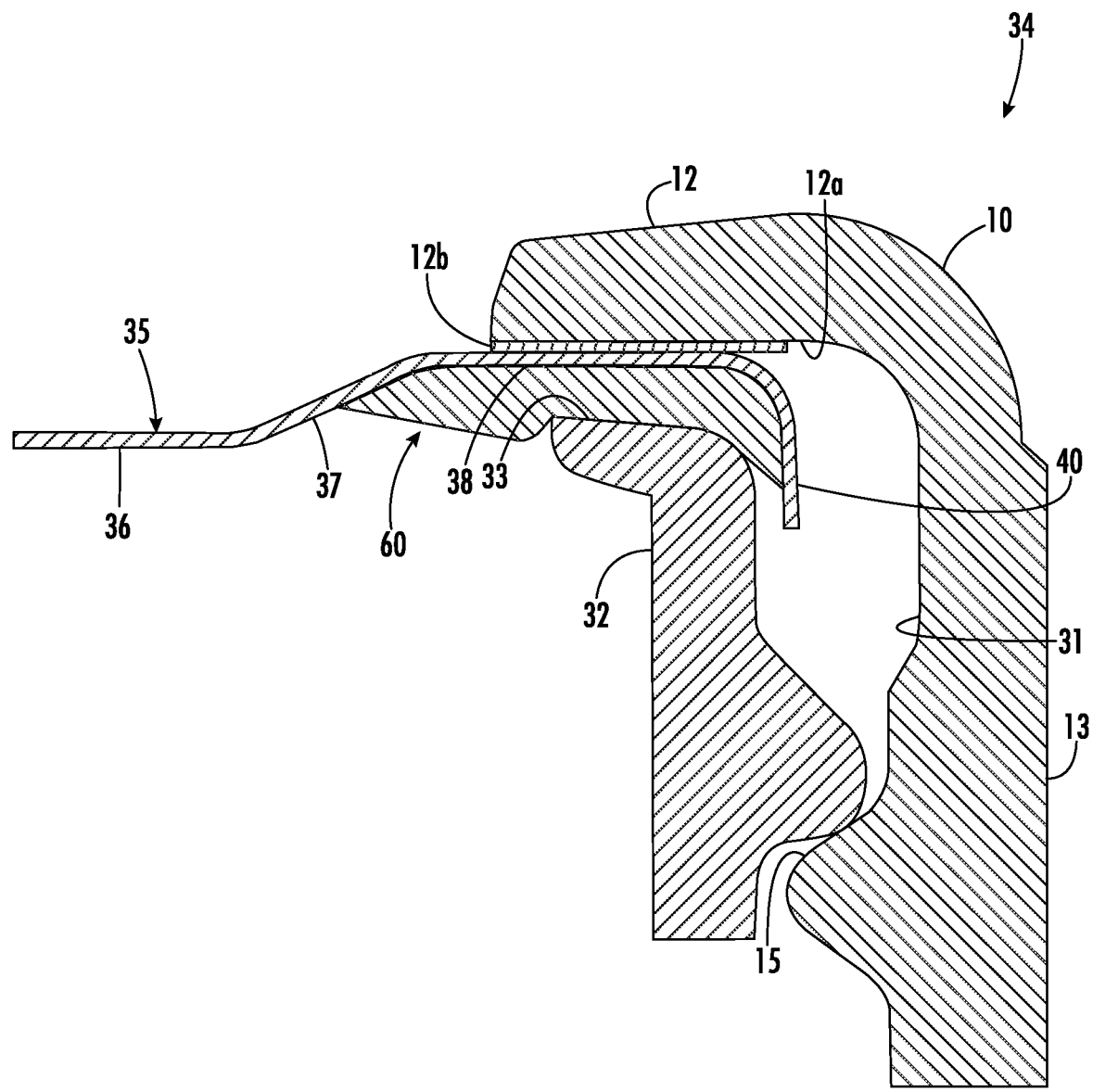
FIG. 11 is a partial longitudinal cross-sectional view of a composite closure cap of another embodiment of this disclosure with the composite closure cap shown in a fully tightened position.

FIGS. 9-10 show composite closure 30 in a fully tightened position, placing gasket 29 that previously had un-compressed cross-sectional shape 50 in compressed conditions. End fit 33 of container 32 compresses gasket 29 making a compressed cross-sectional shape 60. Compressed cross-sectional shape 60 includes an upper curved edge 52 that extends into a generally horizontal edge 54 defined by annular flat surface 22, that extends into an upward sloped edge 56 defined by sloped portion 21 that extends into a downward sloped edge 58 with a curved channel 62 that connects back to upper curved edge 52. FIG. 11 shows another embodiment of the present invention with gasket 29 having compressed cross-sectional shape 60.

FIG. 10 depicts another circumferential location of the fully tightened closure shown in FIG. 9 which corresponds to the open space 17 between bead segments 16. As shown, there is no contact between the curl and the inside wall of fitment 13 in this location.

FIG. 11 depicts another embodiment of the present invention in which a composite closure 34 having a fitment 10 identical to that of the previous embodiment is shown. A modified insert disk 35 is shown which includes a center portion 36, inclined surface 37, and annular surface 38 which respectively correspond to previously described portions 20, 21 and 22 of the first embodiment. The annular surface 38 of this embodiment extends axially downwardly into a flat (uncurled) surface 40. As such, the flat vertical surface 16*a* of bead segments 16 is in full contact with the outer surface 40 of the insert disk 35. As shown, the flat vertical surface of 16*a* of the contact bead imparts a radial force on flat (uncurled) surface of the disk 35, thereby providing the desired readily perceptible resistance upon initial rotation of the closure cap during its removal from the container 32 and the benefits associated therewith as previously described.

Figure 12:
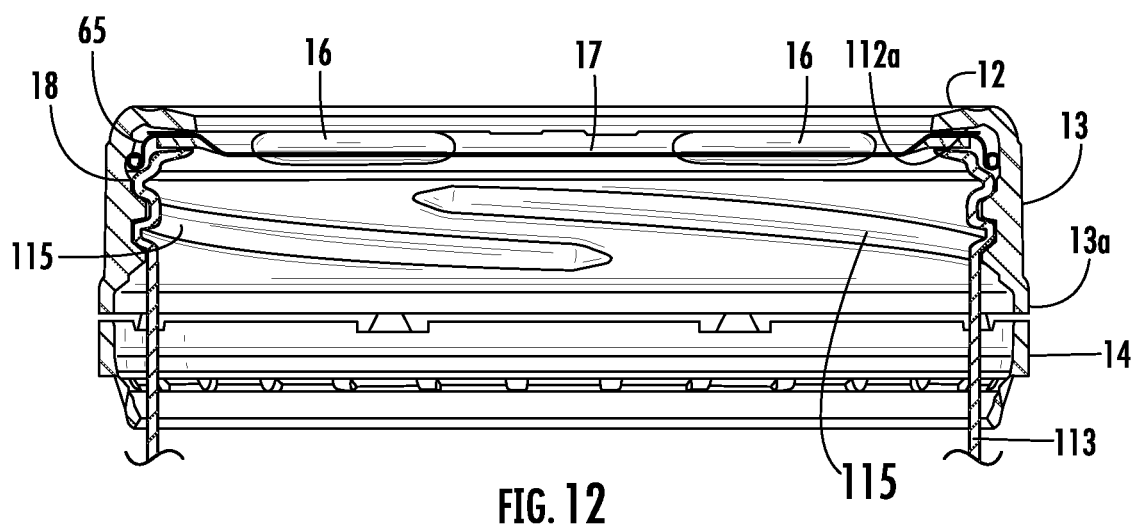
FIG. 12 is a sectional view of the closure cap illustrating an alternative embodiment.

FIGS. 12-18 depict another embodiment of the present invention in which a composite closure 64 having a fitment 10 substantially the same to that of the previous embodiment is shown. FIG. 12 is a sectional view of the closure cap illustrating an alternative embodiment. The closure cap fitment includes a plurality of spaced, radially extending vents 18 along the bottom surface 112*a* and flange 12. The inner circumferential surface of skirt 13 is provided with a plurality of preformed threads 115 for cooperative engagement with the outer threads on a container neck to which the closure will be applied. In the illustrated embodiment, the threads 115 are of a multi-lead design for improved cap application and removal. If desired, however, a single lead thread design could be used.

Figure 13:
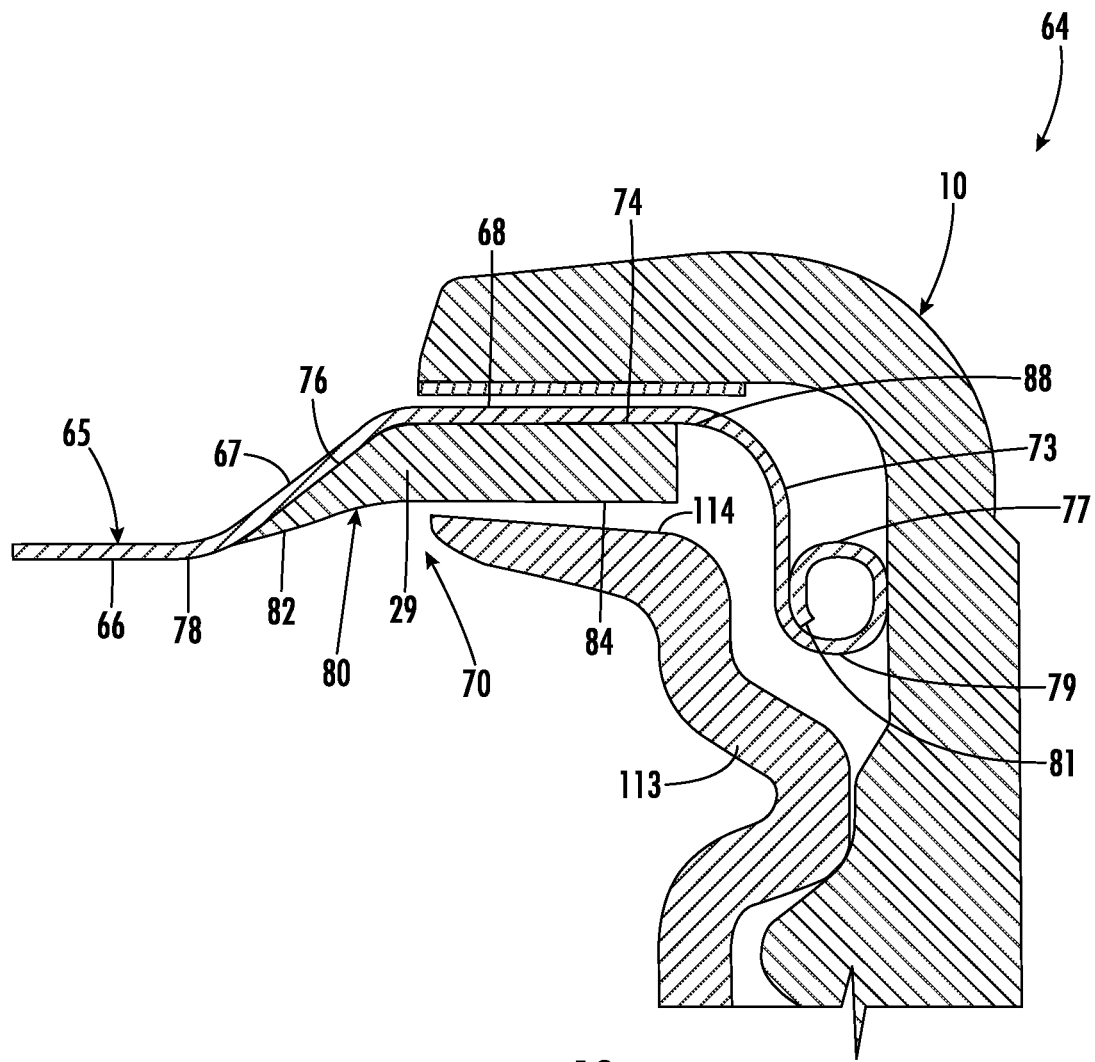
FIG. 13 is a partial longitudinal cross-sectional view of a composite closure cap and container assembly shown with the end panel in a loose position.
Figure 14:
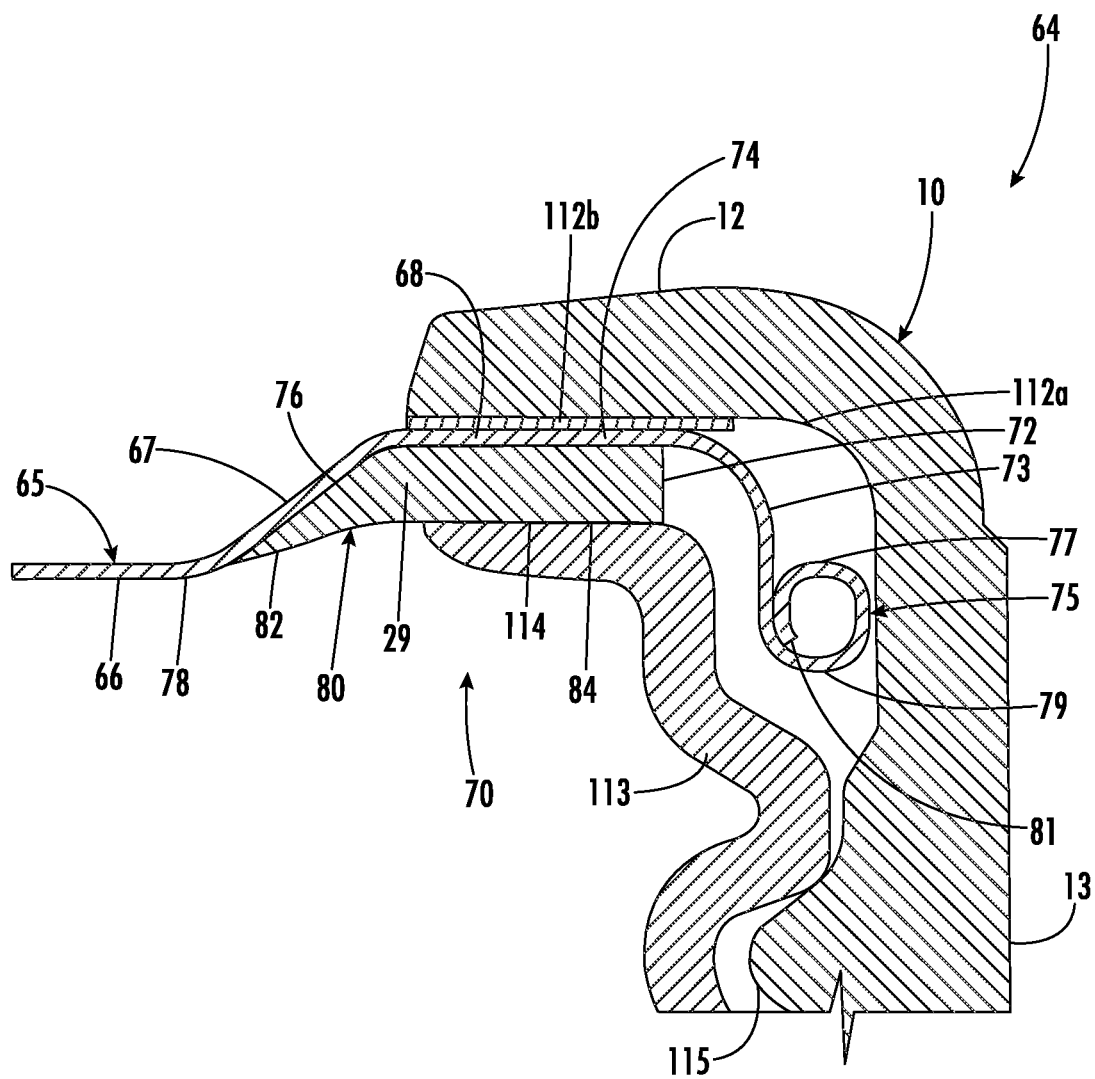
FIG. 14 is a partial longitudinal cross-sectional view of a composite closure cap illustrating an alternative embodiment of a sealing gasket cross-sectional shape.

FIG. 12 illustrates the gasket having the same shape as the cross-sectional views shown in FIGS. 13 and 14. Sectional views of the remaining cross-sectional views, FIGS. 15-18 are substantially the same as FIG. 12 except for the shape of gasket 29. FIG. 13 shows gasket 29 having a second un-compressed cross-sectional shape 70 with an alternative end panel 65 in a loose position. As shown in FIG. 14, the end panel 65 and gasket 29 are positioned in the space between the bottom surface 112*a* of fitment 10 and an end finish 114 of a container 113. End finish 114 of container 113 compresses gasket 29 making a compressed cross-sectional shape when composite closure 64 is tightened.

FIG. 14 illustrates un-compressed cross-sectional shape 70 in an intermediate position. The intermediate position depicted in FIG. 14 shows the end finish 114 in initial contact with the gasket 29 and the annular flat surface 68 of the end panel 65 in initial contact with the vent-defining portion 112*b* of flange 12.

Referring to FIGS. 12-18, a modified insert disk 65 is shown which includes a center portion 66, inclined surface 67, and annular flat surface 68 which respectively correspond to previously described portions 20, 21 and 22 of the first embodiment. The underside surfaces of inclined surface 67, annular flat portion 68 and an axially downwardly extending portion 73 of the end panel define a channel 88 in which a suitable sealing material can be deposited to form a suitable sealing gasket 29 for sealing against an end finish of a container to which the composite closure formed by fitment 10 and end panel 65 (collectively identified by the reference numeral 64) is applied.

The annular surface 68 of this embodiment continues into the axially downwardly extending portion 73 that terminates in a curl 75 which includes an upper curved surface 77 and a bottom curved surface 79. As shown, the raw cut edge 81 of the end panel is not exposed.

FIG. 14 shows gasket 29 having un-compressed cross-sectional shape 70. Un-compressed cross-sectional shape 70 includes a generally rectangular portion connected to a tapered end. Cross-sectional shape 70 is defined by a generally vertical edge 72 that extends into a generally horizontal edge 74, defined by annular flat surface 68, that extends into an upward sloped edge 76, defined by inclined portion 67, that continues until it reaches a bottom curved surface 78 of center portion 66 and then extends into connecting edge 80. Connecting edge 80 includes an upward curved portion 82 and a generally horizontal portion 84 that continues until it reaches generally vertical edge 72.

Figure 15:
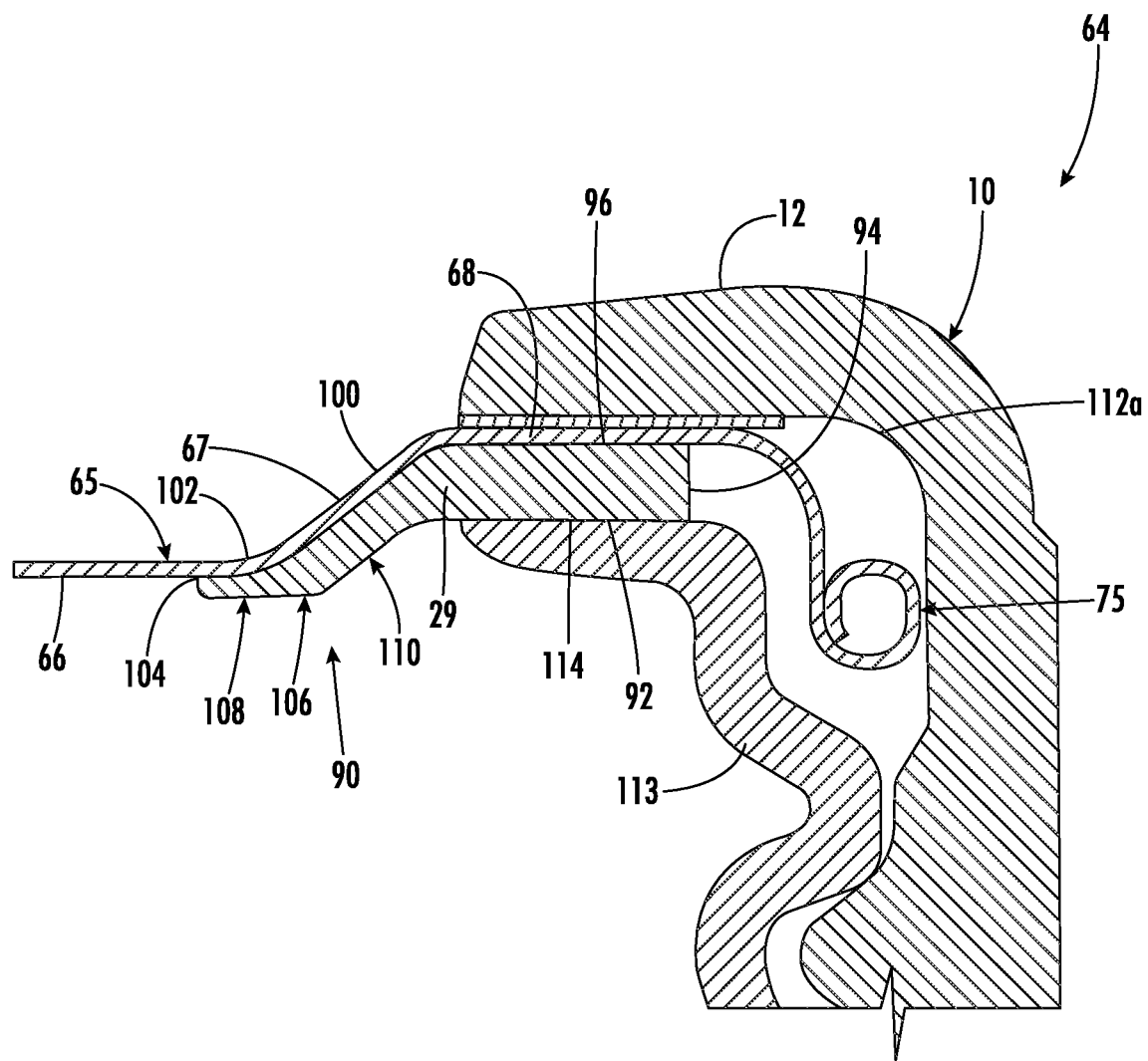
FIG. 15 is a partial longitudinal cross-sectional view of a composite closure cap illustrating an alternative embodiment of a sealing gasket cross-sectional shape.

FIG. 15 shows gasket 29 having a third un-compressed cross-sectional shape 90. Un-compressed cross-sectional shape 90 includes a generally rectangular portion with an extended tapered arm. Cross-sectional shape 90 is defined by a generally horizontal edge 92 that extends into a vertical edge 94 which continues into a second generally horizontal edge 96, defined by annular flat surface 68. Generally horizontal edge 94 extends into a curved edge 98 that includes an upward sloped portion 100, defined by inclined portion 67, and a curved portion 102 that continues around center portion 66 connecting to generally vertical line 104. A curved connecting edge 106 includes a short generally horizontal edge 108 and an upward sloped edge 110 that extends back to generally horizontal edge 92.

Figure 16:
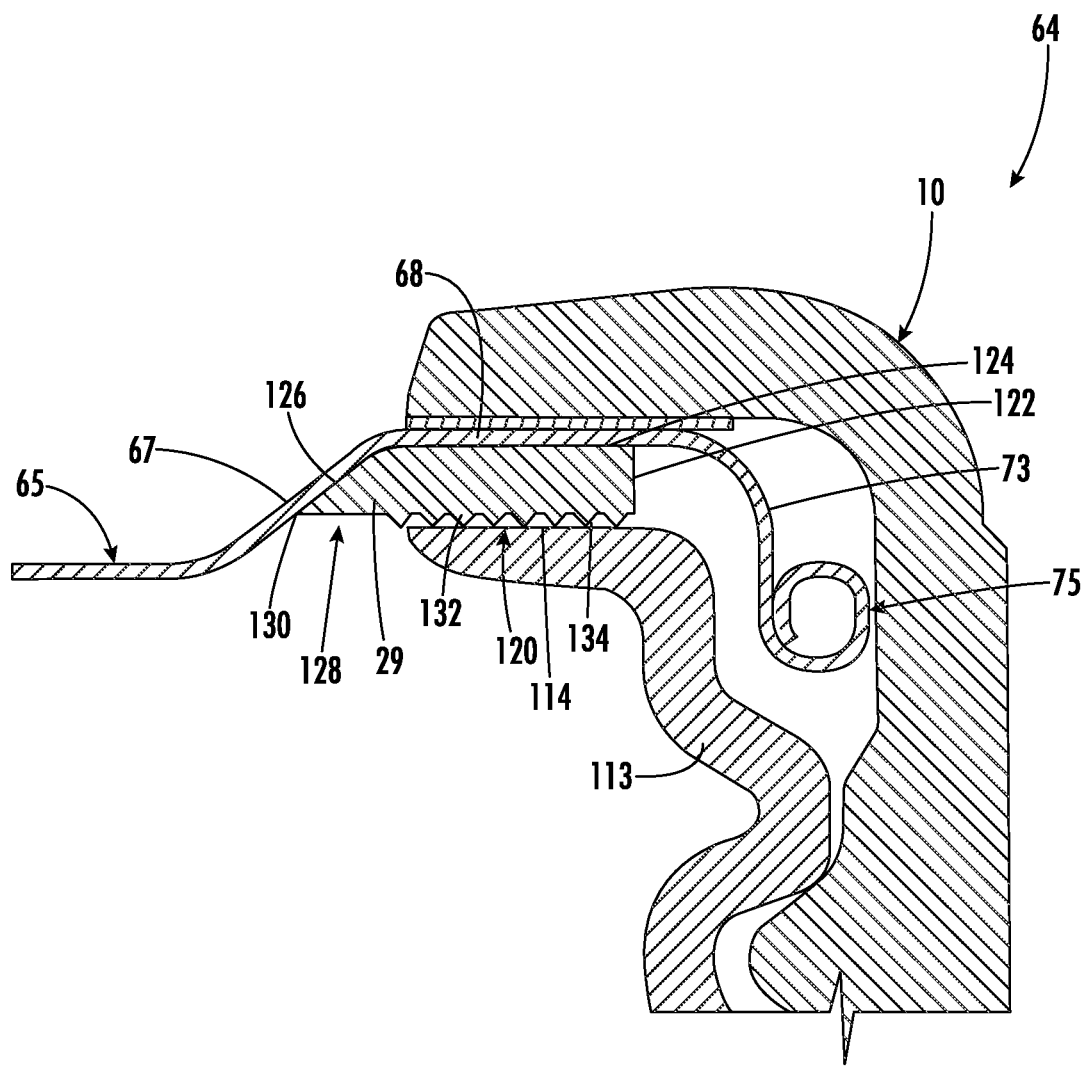
FIG. 16 is a partial longitudinal cross-sectional view of a composite closure cap illustrating an alternative embodiment of a sealing gasket cross-sectional shape.

FIG. 16 shows gasket 29 having a fourth un-compressed cross sectional shape 120. Un-compressed cross-sectional shape 120 includes a generally rectangular portion with a small taper, where the bottom segment of the generally rectangular section includes triangular projections. Cross-sectional shape 120 is defined by a generally vertical edge 122 that extends into a generally horizontal edge 124, defined by annular flat surface 68, that extends into an upward sloped edge 126, defined by inclined portion 67, which extends to bottom generally horizontal edge 128 that continues until it reaches generally vertical edge 122. Bottom generally horizontal edge 128 includes a purely horizontal segment 130 followed by a second horizontal segment 132 containing triangular projections 134.

Figure 17:
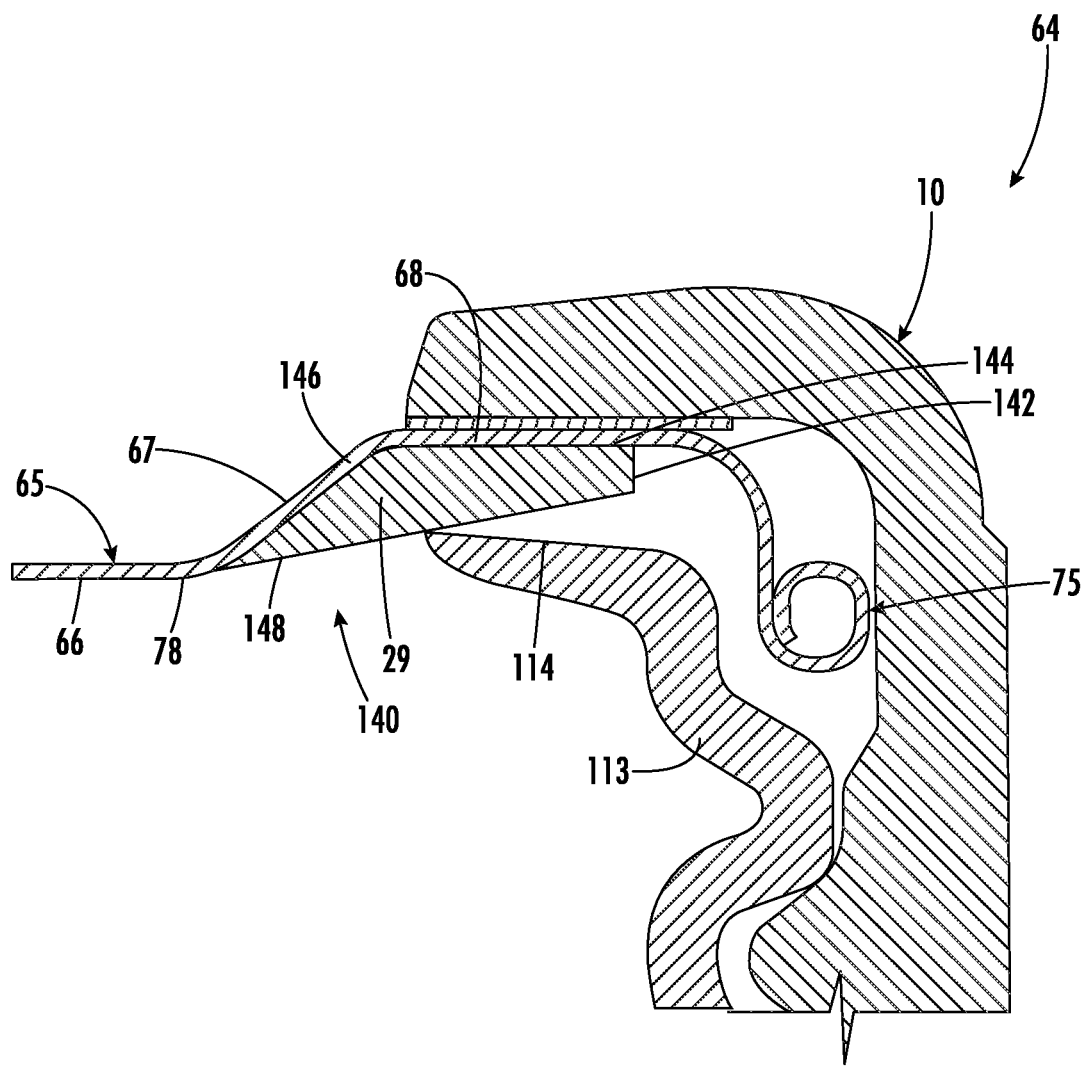
FIG. 17 is a partial longitudinal cross-sectional view of a composite closure cap illustrating an alternative embodiment of a sealing gasket cross-sectional shape.

FIG. 17 shows gasket 29 having a fifth un-compressed cross-sectional shape 140. Cross-sectional shape 140 is defined by a generally vertical edge 142 that extends into a generally horizontal edge 144, defined by annular flat surface 68, that extends into an upward sloped edge 146, defined by inclined portion 67, that continues until it reaches a bottom curved surface 78 of center portion 66 and then extends into connecting edge 148. Connecting edge 148 includes a second upward sloped edge with a slope less steep than upward sloped edge 146. Connecting edge 148 continues until it reaches generally vertical edge 142.

Figure 18:
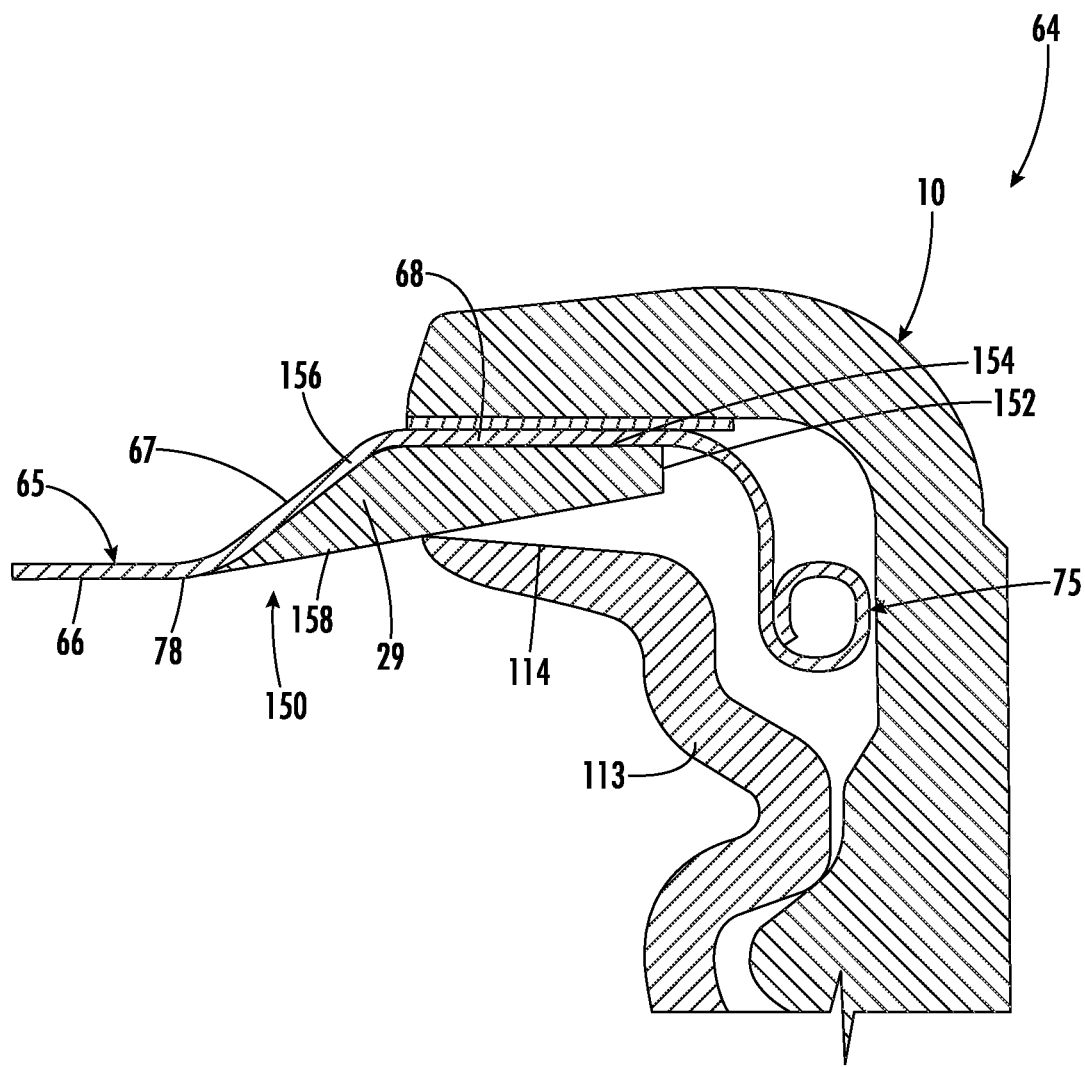
FIG. 18 is a partial longitudinal cross-sectional view of a composite closure cap illustrating an alternative embodiment of a sealing gasket cross-sectional shape.

FIG. 18 shows gasket 29 having a sixth un-compressed cross-sectional shape 150. Cross-sectional shape 150 is defined by a generally vertical edge 152 that extends into a generally horizontal edge 154, defined by annular flat surface 68, that extends into an upward sloped edge 156, defined by inclined portion 67, that continues until it reaches a bottom curved surface 78 of center portion 66 and then extends into connecting edge 158. Connecting edge 158 includes a second upward sloped edge with a slope less steep than upward sloped edge 156. Connecting edge 158 continues until it reaches generally vertical edge 152. The slope of connecting edge 158 is different from the slope of connecting edge 148.

Figure 19:
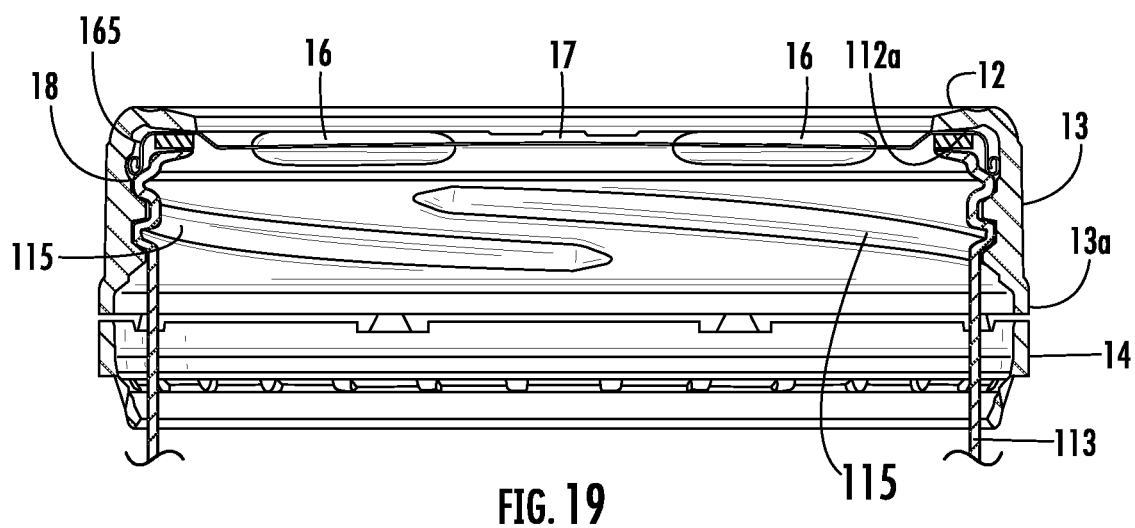
FIG. 19 is a sectional view of the closure cap illustrating an alternative embodiment.

FIGS. 19-31 depict additional embodiments of the present invention in which a composite closure 164 having a fitment 10 substantially the same the previously discussed embodiments is shown. FIG. 19 is a sectional view of the closure cap illustrating an alternative embodiment. The closure cap fitment includes a plurality of spaced, radially extending vents 18 along the bottom surface 112a and flange 12. The inner circumferential surface of skirt 13 is provided with a plurality of preformed threads 115 for cooperative engagement with the outer threads on a container neck to which the closure will be applied. In the illustrated embodiment, the threads 115 are of a multi-lead design for improved cap application and removal. If desired, however, a single lead thread design could be used.

Figure 20:
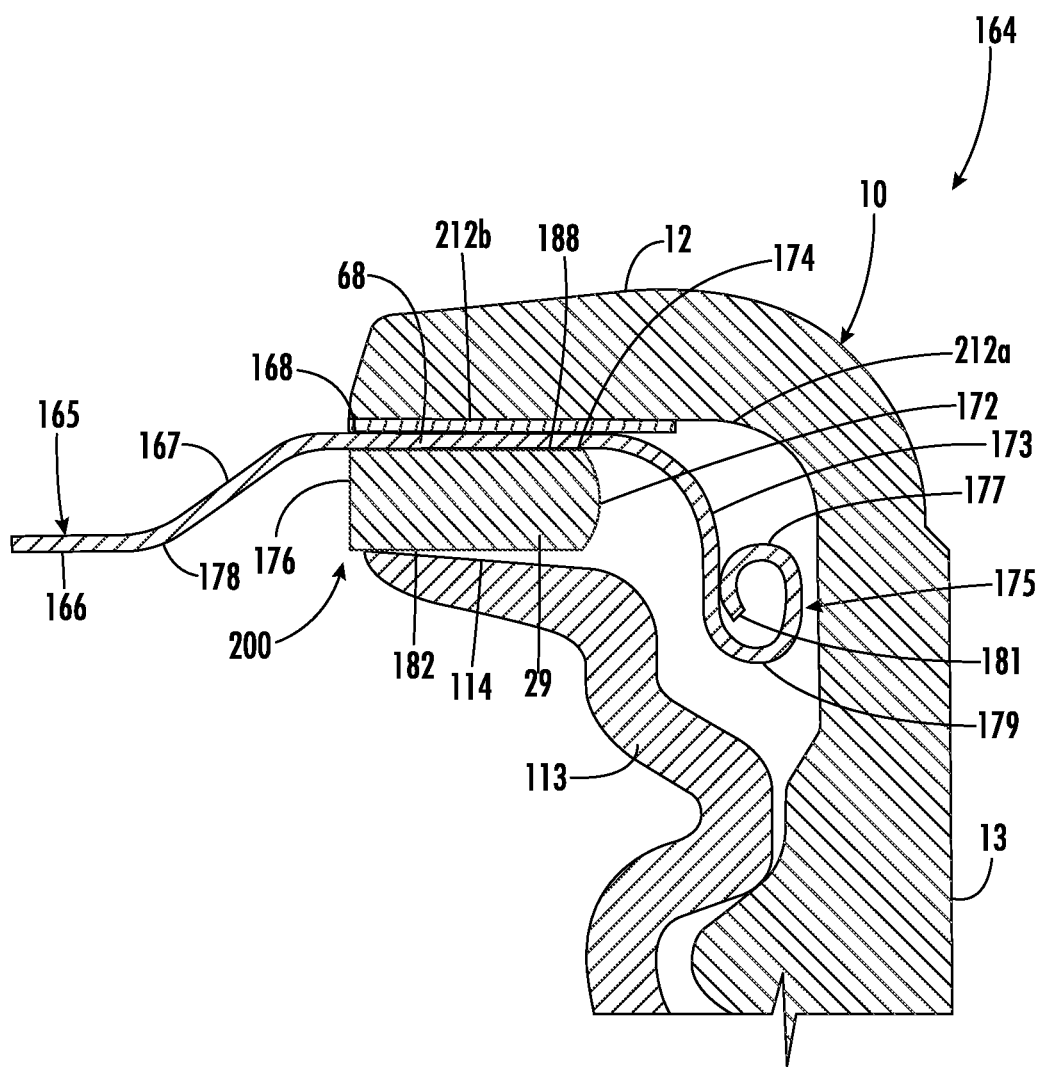
FIG. 20 is a partial longitudinal cross-sectional view of a composite closure cap illustrating an alternative embodiment of a sealing gasket cross-sectional shape.
Figure 21:
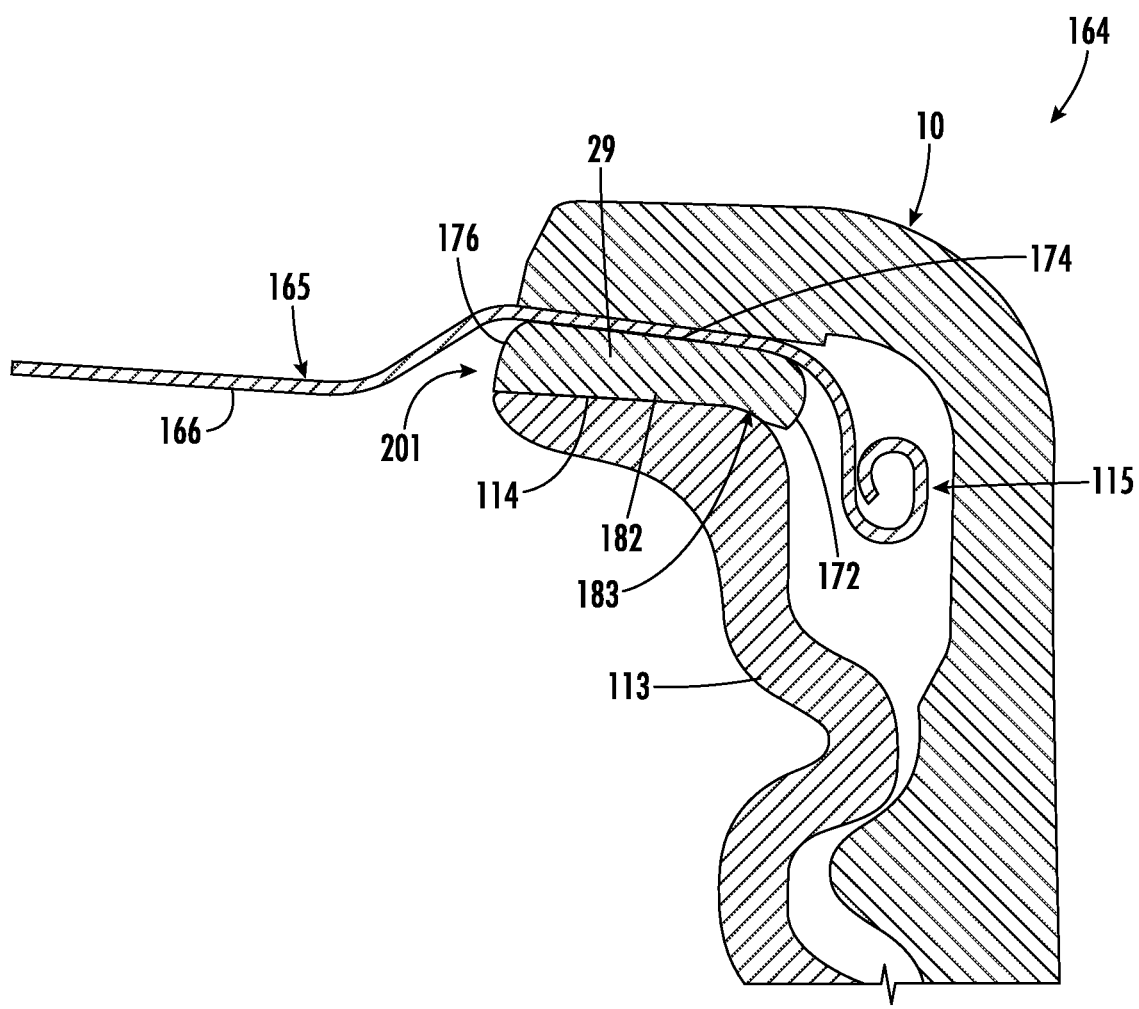
FIG. 21 is a partial longitudinal cross-sectional view of a composite closure cap of FIG. 20 with the composite closure cap shown in a tightened position.

FIG. 19 illustrates a gasket having the same shape as the partial cross-sectional views shown in FIGS. 20 and 21. Sectional views of the remaining cross-sectional views, FIGS. 22-31 are substantially the same as FIG. 19 except for the shape of gasket 29.

Referring to FIGS. 19-31, a modified insert disk 165 is shown which includes a center portion 166, inclined surface 167, and annular flat surface 168 which respectively correspond to previously described portions 20, 21 and 22 (and 66, 67 and 6) of the previous embodiments. The underside surfaces of inclined surface 167, annular flat surface 168 and an axially downwardly extending portion 173 of the end panel define a channel 188 in which a suitable sealing material can be deposited to form a suitable sealing gasket 29 for sealing against an end finish of a container to which the composite closure formed by fitment 10 and end panel 165 (collectively identified by the reference numeral 164) is applied.

The annular surface 168 of this embodiment continues into the axially downwardly extending portion 173 that terminates in a curl 175 which includes an upper curved surface 177 and a bottom curved surface 179. As shown in FIG. 20, the raw cut edge 181 of the end panel is not exposed.

As shown in FIG. 20, the end panel 165 and gasket 29 are positioned in the space between the bottom surface 212a of fitment 10 and end finish 114 of the container 113. End finish 114 of container 113 compresses gasket 29 making a compressed cross-sectional shape when composite closure 164 is tightened. Composite closure 164 can similarly be coupled to various containers (e.g., container 32 in FIG. 11, container 313 in FIG. 29, container 413 in FIG. 30, container 513 in FIG. 31, etc.).

FIG. 20 shows gasket 29 having the seventh un-compressed cross-sectional shape 200. Un-compressed cross-sectional shape 200 includes a generally rectangular portion connected to a curved end. Cross-sectional shape 200 is defined by a curved edge 172 that extends into a generally horizontal edge 174, defined by annular flat surface 168, that extends into a generally vertical edge 176 (e.g., generally perpendicular to edges 174 and 182 or about 90°±10°) that extends into a generally horizontal connecting edge 182 that continues until it reaches curved edge 172.

In a specific embodiment, gasket 29 having cross-sectional shape 200 has a volume between 0.01 $in^3$ to 0.05 $in^3$, and specifically between 0.02 $in^3$ to 0.04 $in^3$. In such an embodiment the volume is about 0.028 $in^3$ (e.g., 0.028 $in^3$±0.006 $in^3$) and a weight of about 0.47 grams (e.g., 0.47 grams±0.094 grams).

FIG. 21 shows composite closure 164 in a tightened position, placing gasket 29 that previously had un-compressed cross-sectional shape 200 (see e.g., FIG. 20) in compressed conditions. End fit 114 of container 113 compresses gasket 29 making a compressed cross-sectional shape 201. Compressed cross-sectional shape 201 includes an curved edge 172 that extends into formerly generally horizontal edge 174 that now has a downward slope defined by surface 168, that extends into a now curved edge 176 that extends into a downward sloped edge 182 with a curved portion 183 defined by end fit 114, that connects back to curved edge 172.

Figure 22:
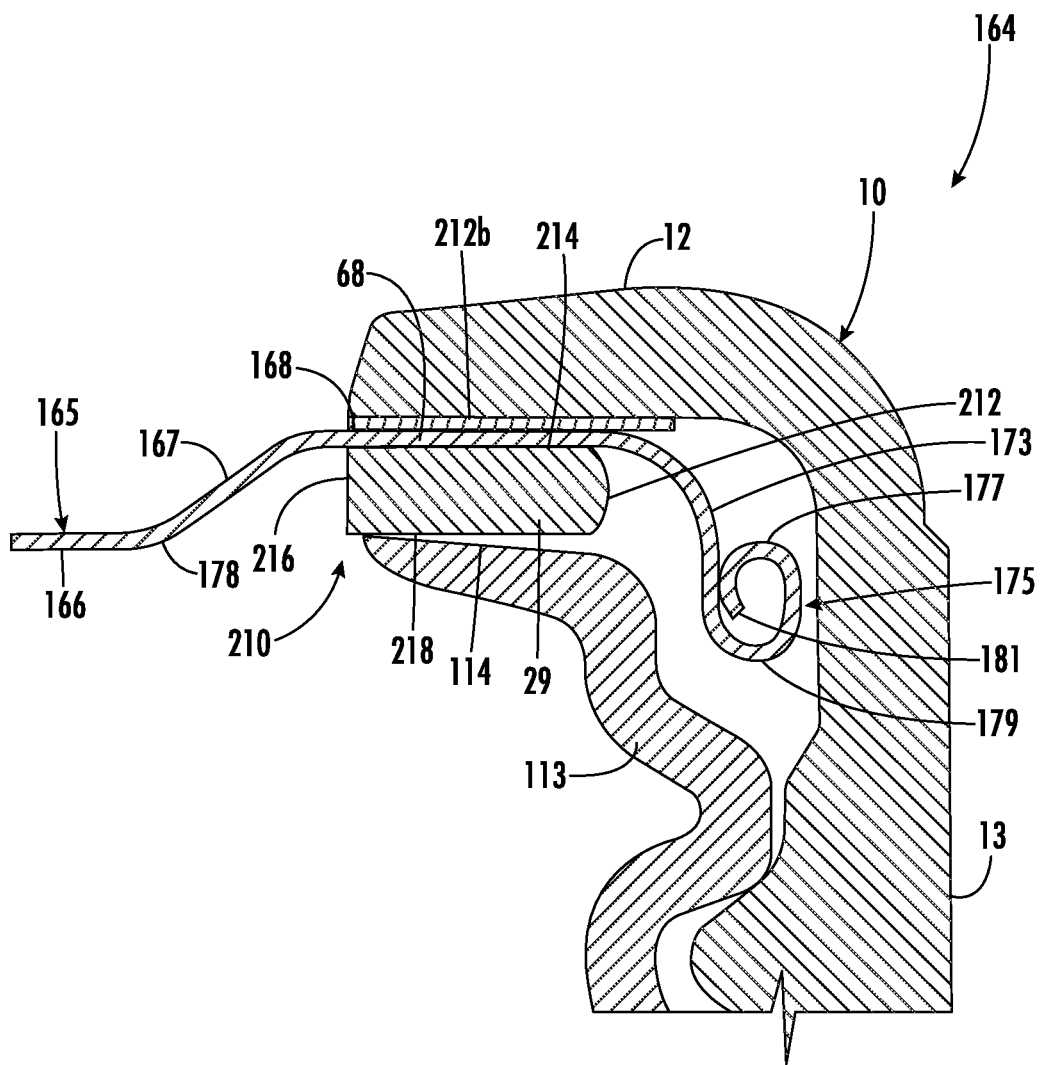
FIG. 22 is a partial longitudinal cross-sectional view of a composite closure cap illustrating an alternative embodiment of a sealing gasket cross-sectional shape.

FIG. 22 shows gasket 29 having the eighth un-compressed cross-sectional shape 210. Un-compressed cross-sectional shape 210 includes a generally rectangular portion connected to a curved end. Cross-sectional shape 210 is defined by a curved edge 212 that extends into a generally horizontal edge 214, defined by annular flat surface 168, that extends into a generally vertical edge 216 (e.g., generally perpendicular to edges 214 and 218 or about 90°±10°) that extends into a generally horizontal connecting edge 218 that continues until it reaches curved edge 212.

Cross-sectional shape 210 is substantially the same as cross-sectional shape 200 except for the vertical distance between generally horizontal edge 214 and generally horizontal connecting edge 218 is reduced. In a specific embodiment, gasket 29 having cross-sectional shape 210 has a volume between 0.01 $in^3$ to 0.05 $in^3$, and specifically between 0.02 $in^3$ to 0.04 $in^3$. In such an embodiment the volume is about 0.025 $in^3$ (e.g., 0.025 $in^3$±0.005 $in^3$) and a weight of about 0.42 grams (e.g., 0.42 grams±0.084 grams).

Figure 23:
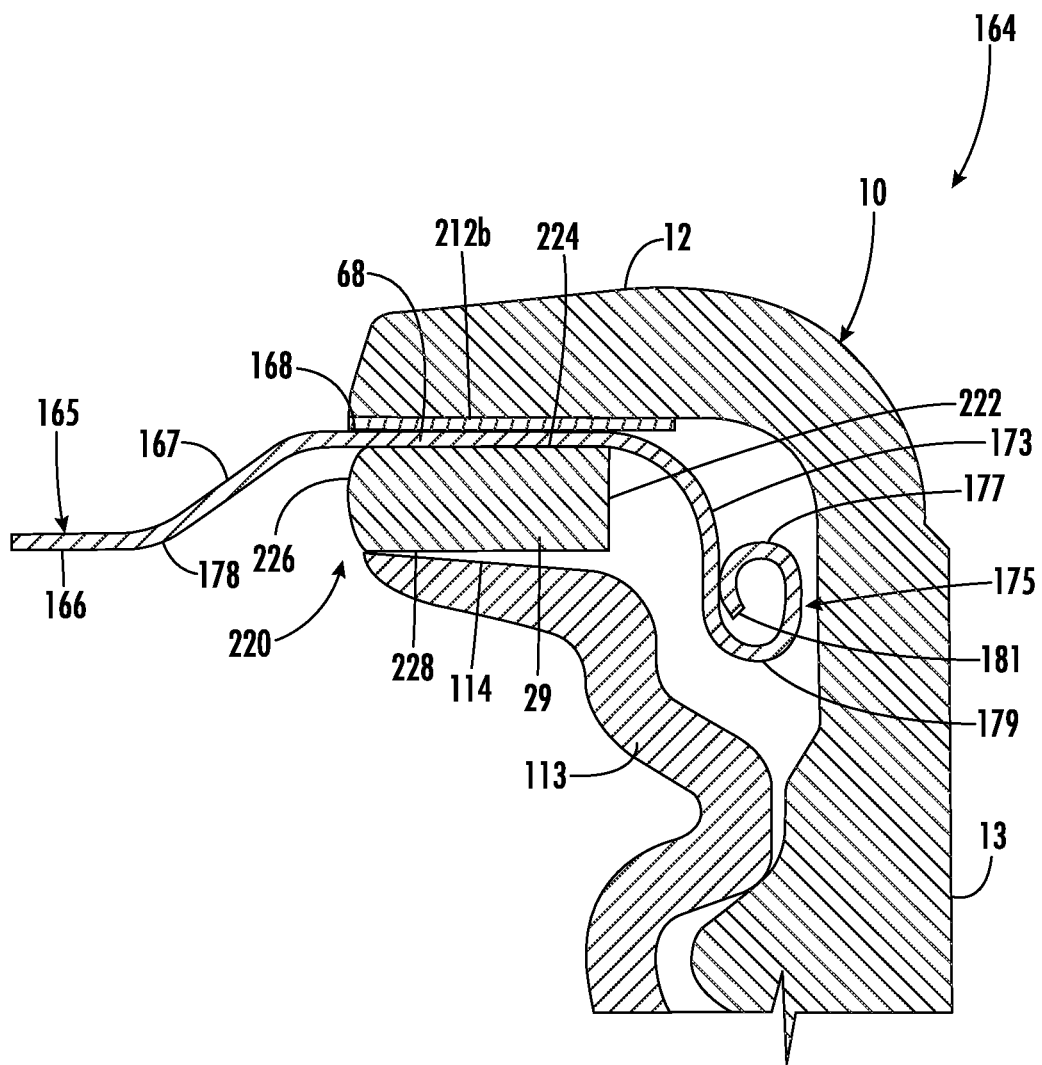
FIG. 23 is a partial longitudinal cross-sectional view of a composite closure cap illustrating an alternative embodiment of a sealing gasket cross-sectional shape.

FIG. 23 shows gasket 29 having the ninth un-compressed cross-sectional shape 220. Un-compressed cross-sectional shape 220 includes a generally rectangular portion connected to a curved end. Cross-sectional shape 220 is defined by a generally vertical edge 222 (e.g., generally perpendicular to edges 224 and 228 or about 90°±10°) that extends into a generally horizontal edge 224, defined by annular flat surface 168, that extends into a curved edge 226, that extends into a generally horizontal connecting edge 228 that continues until it reaches generally vertical edge 222.

Cross-sectional shape 220 is substantially the same as cross-sectional shape 200 except curved edge 226 is positioned proximal to inclined surface 167 and distal from downwardly extending portion 173 of the end panel 165. In a specific embodiment, gasket 29 having cross-sectional shape 220 has a volume between 0.01 $in^3$ to 0.05 $in^3$, and specifically between 0.02 $in^3$ to 0.04 $in^3$. In such an embodiment the volume is about 0.027 $in^3$ (e.g., 0.027 $in^3$±0.0054 $in^3$) and a weight of about 0.45 grams (e.g., 0.45 grams±0.09 grams).

Figure 24:
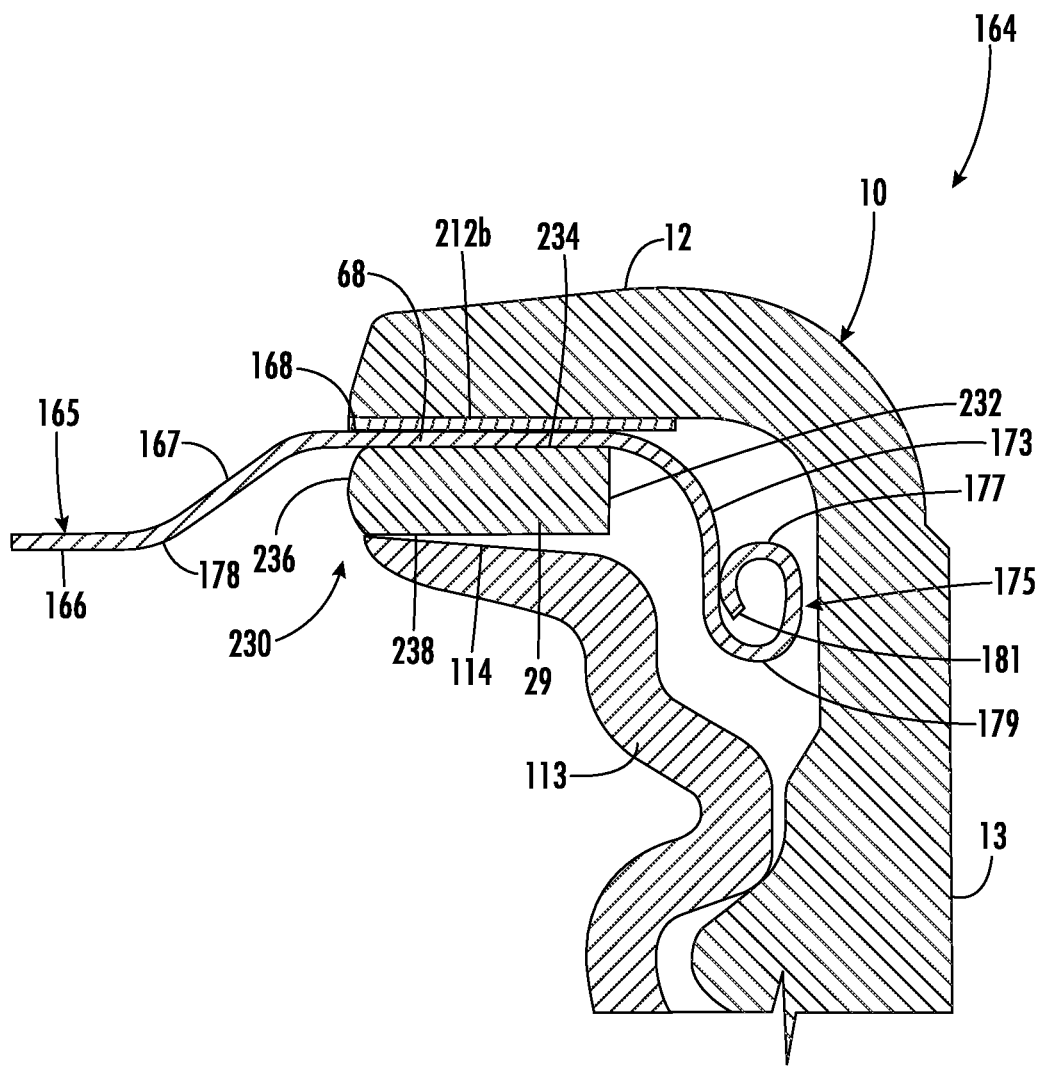
FIG. 24 is a partial longitudinal cross-sectional view of a composite closure cap illustrating an alternative embodiment of a sealing gasket cross-sectional shape.

FIG. 24 shows gasket 29 having the tenth un-compressed cross-sectional shape 230. Un-compressed cross-sectional shape 230 includes a generally rectangular portion connected to a curved end. Cross-sectional shape 230 is defined by a generally vertical edge 232 (e.g., generally perpendicular to edges 234 and 238 or about 90°±10°) that extends into a generally horizontal edge 234, defined by annular flat surface 168, that extends into a curved edge 236, that extends into a generally horizontal connecting edge 238 that continues until it reaches generally vertical edge 232.

Cross-sectional shape 230 is substantially the same as cross-sectional shape 220 except for the vertical distance between generally horizontal edge 234 and generally horizontal connecting edge 238 is reduced. In a specific embodiment, gasket 29 having cross-sectional shape 230 has a volume between 0.01 in$^3$ to 0.05 in$^3$, and specifically between 0.02 in$^3$ to 0.04 in$^3$. In such an embodiment the volume is about 0.025 in$^3$ (e.g., 0.025 in$^3$±0.005 in$^3$) and a weight of about 0.42 grams (e.g., 0.42 grams±0.084 grams).

Figure 25:
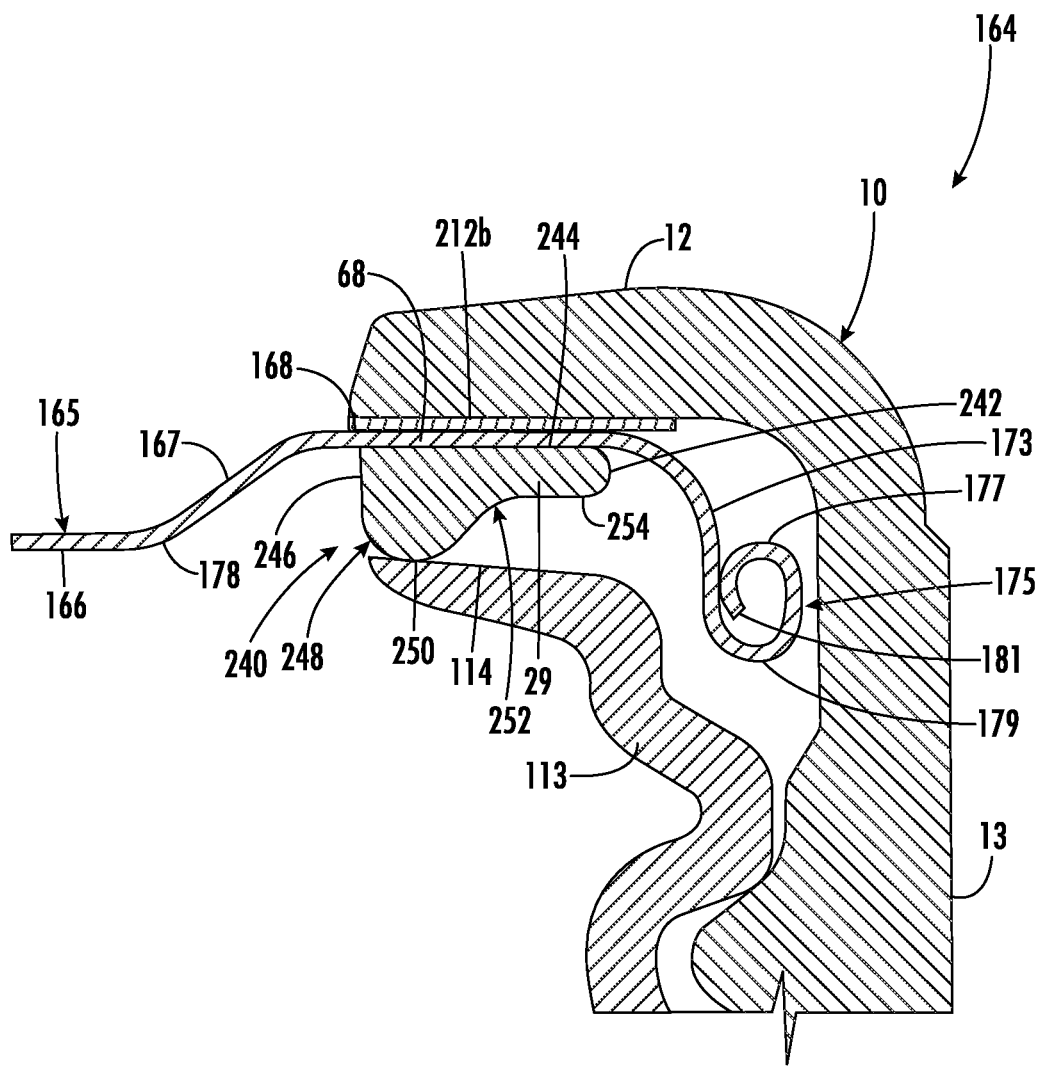
FIG. 25 is a partial longitudinal cross-sectional view of a composite closure cap illustrating an alternative embodiment of a sealing gasket cross-sectional shape.

FIG. 25 shows gasket 29 having an eleventh un-compressed cross-sectional shape 240. Un-compressed cross-sectional shape 240 is defined by a curved edge 242 that extends into a generally horizontal edge 244, defined by annular flat surface 168, that extends into a generally vertical edge 246 (e.g., generally perpendicular to edge 244 or about 90°±10°) that extends into a connecting edge 248. Connecting edge 248 includes a curved portion 250 having a generally concave shape, that extends into an opposing curved portion 252 having a generally convex shape and a generally horizontal portion 252 that continues until it reaches curved edge 242. Curved portion 250 extends below (in the orientation shown) bottom curved surface 178 of center portion 166 of end panel 165.

In a specific embodiment, gasket 29 having cross-sectional shape 240 has a volume between 0.005 in$^3$ to 0.04 in$^3$, and specifically between 0.01 in$^3$ to 0.03 in$^3$. In such an embodiment the volume is about 0.02 in$^3$ (e.g., 0.02 in$^3$±0.004 in$^3$) and a weight of about 0.33 grams (e.g., 0.33 grams±0.066 grams).

Figure 26:
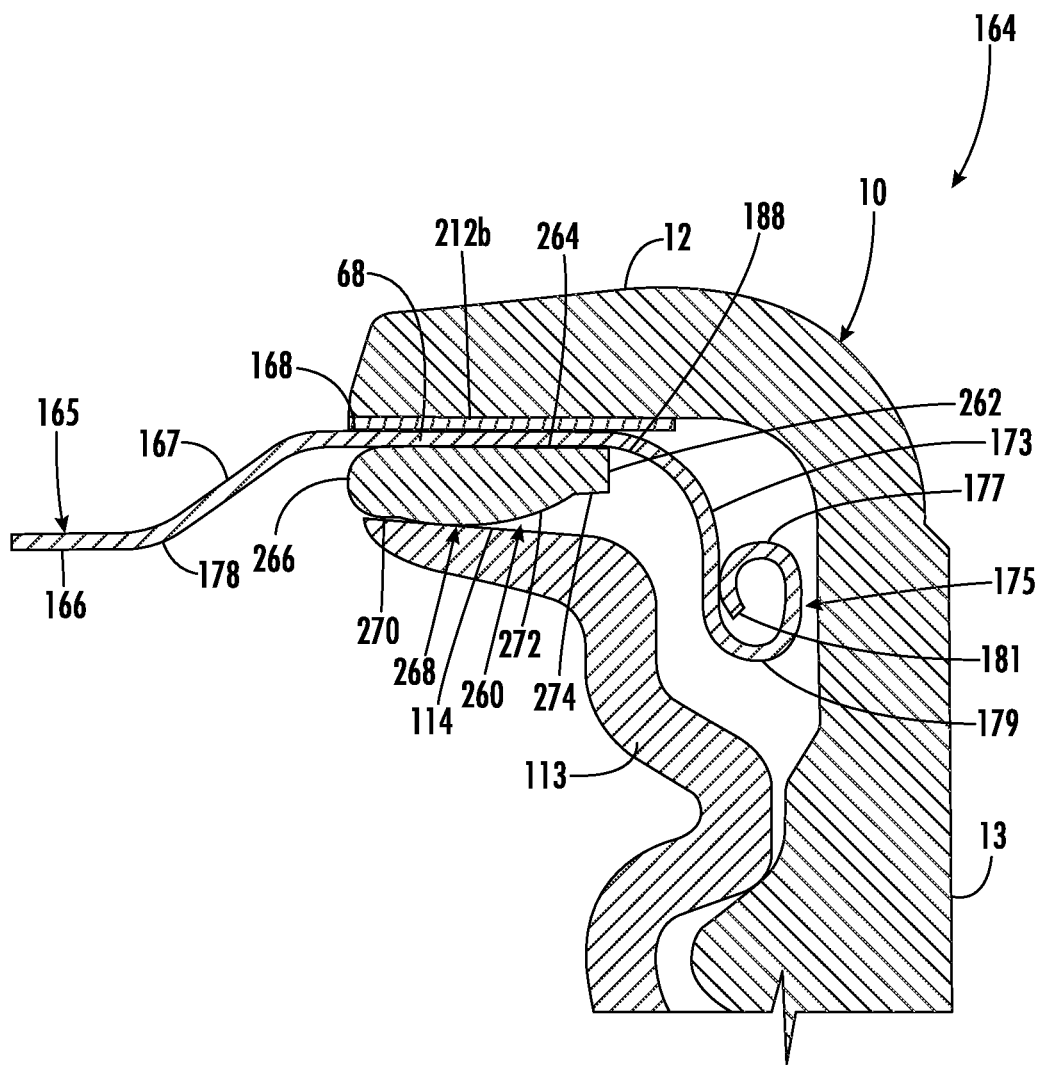
FIG. 26 is a partial longitudinal cross-sectional view of a composite closure cap illustrating an alternative embodiment of a sealing gasket cross-sectional shape.

FIG. 26 shows gasket 29 having a twelfth un-compressed cross-sectional shape 260. Un-compressed cross-sectional shape 260 is defined by a generally vertical edge 262 (e.g., generally perpendicular to edges 264 and 274 or about 90°±10°) that extends into a generally horizontal edge 264, defined by annular flat surface 168, that extends into a curved edge 266 that extends into a connecting edge 268. Connecting edge 268 includes a generally horizontal portion 270, that extends into a curved portion 272 having a generally concave shape and a generally horizontal portion 274 that continues until it reaches generally vertical edge 262. At least a portion of curved portion 268 extends below (in the orientation shown) generally horizontal portion 270.

In a specific embodiment, gasket 29 having cross-sectional shape 260 has a volume between 0.005 in$^3$ to 0.04 in$^3$, and specifically between 0.01 in$^3$ to 0.03 in$^3$. In such an embodiment the volume is about 0.021 in$^3$ (e.g., 0.02 in$^3$±0.004 in$^3$) and a weight of about 0.35 grams (e.g., 0.35 grams±0.07 grams).

In general, Applicant has found the average linear compression varies depending on the thickness (e.g., vertical dimension of cross-sectional gasket views) of gasket 29 and based on the shape and/or size of the container trim finish. Generally, Applicant believes the thinner gaskets will have a smaller average compression (e.g., cross-sections 200 and 220 average compression is less than cross-sections 210 and 230).

Figure 27:
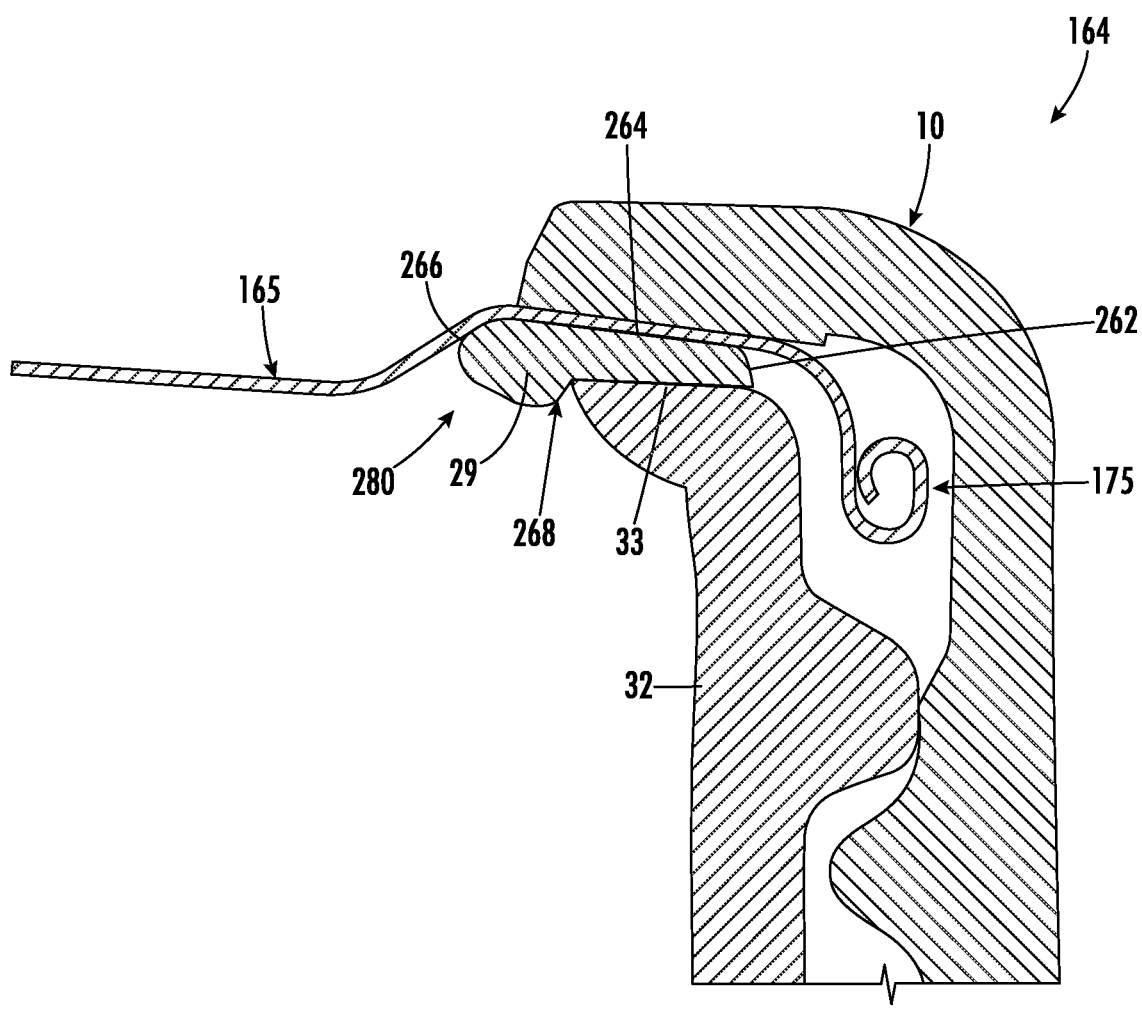
FIG. 27 is partial longitudinal cross-section view of the composite closure cap and sealing gasket of FIG. 26 with an alternative embodiment of the container shown in a tightened position.

FIG. 27 shows composite closure 164 in a tightened position, placing gasket 29 that previously had un-compressed cross-sectional shape 260 (see e.g., FIG. 26) in compressed conditions. End fit 33 of container 32 compresses gasket 29 making a compressed cross-sectional shape 280. Compressed cross-sectional shape 280 includes an curved edge 262 (formerly generally vertical) that extends into formerly generally horizontal edge 264 that now has a downward slope defined by surface 168, that extends into a now curved edge 266 that is partially defined by inclined surface 167. This curved portion 266 extends into another section that was previously at least partially curved portion 272. This section includes a different curvature than 266 and extends downward below end fit 33 before sloping upward and connecting to a sloped edge (previously at least partially 274) defined by end fit 33, that connects back to curved edge 262.

Figure 28:
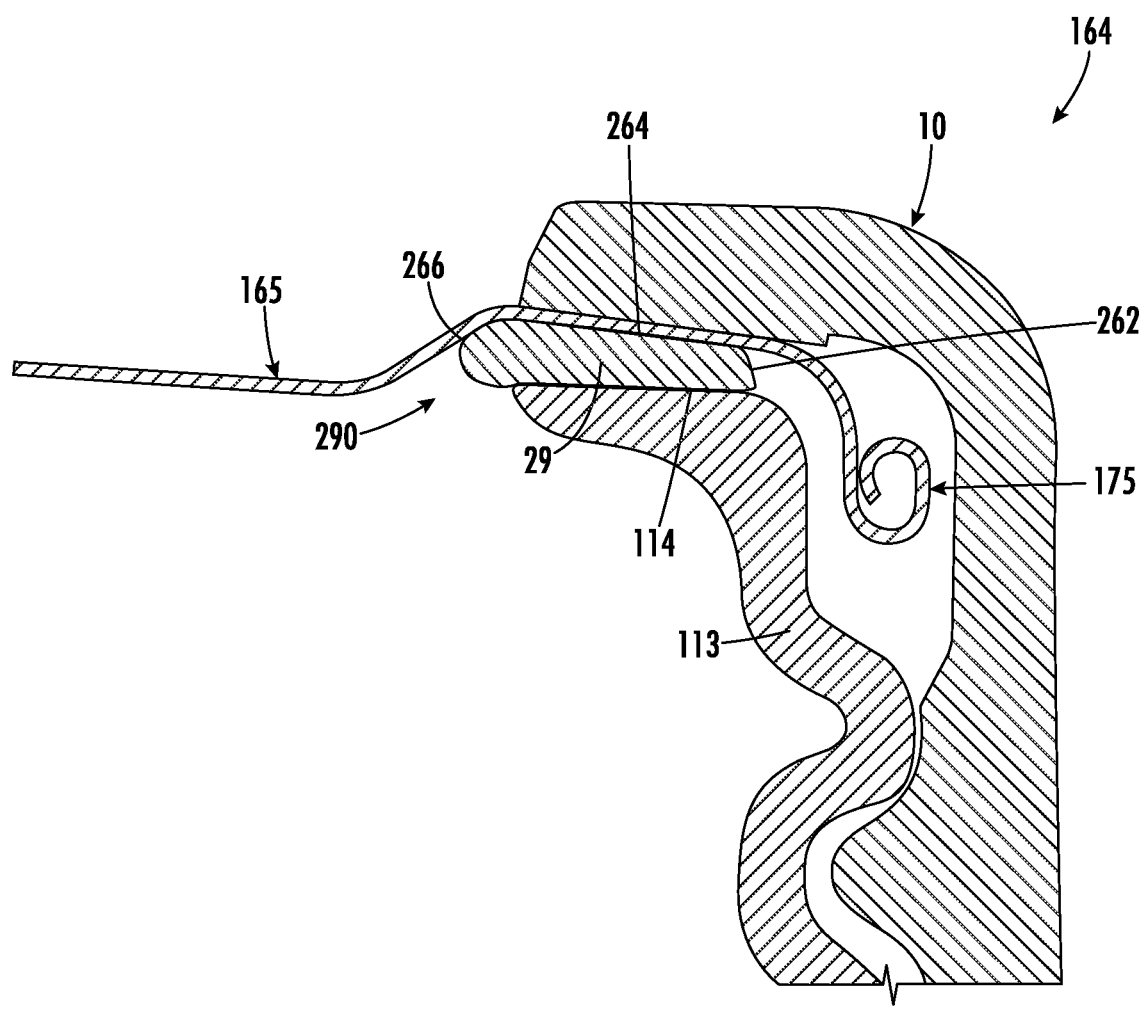
FIG. 28 is a partial longitudinal cross-sectional view of a composite closure cap of FIG. 26 with the composite closure cap shown in a tightened position.

Referring to FIG. 28 shows composite closure 164 in a tightened position, placing gasket 29 that previously had un-compressed cross-sectional shape 260 (see e.g., FIG. 26) in compressed conditions. End fit 114 of container 113 compresses gasket 29 making a compressed cross-sectional shape 290. Compressed cross-sectional shape 290 includes a curved edge 262 (formerly generally vertical) that extends into formerly generally horizontal edge 264 that now has a downward slope defined by surface 168, that extends into a now curved edge 266 that is partially defined by inclined surface 167. This curved portion 266 extends into another section that was previously at least partially curved portion 272. This section includes a different curvature than 266 and extends slightly downward below end fit 114 before sloping upward and connecting to a sloped edge (previously at least partially 274) defined by end fit 114, and then connects back to curved edge 262.

Figure 29:
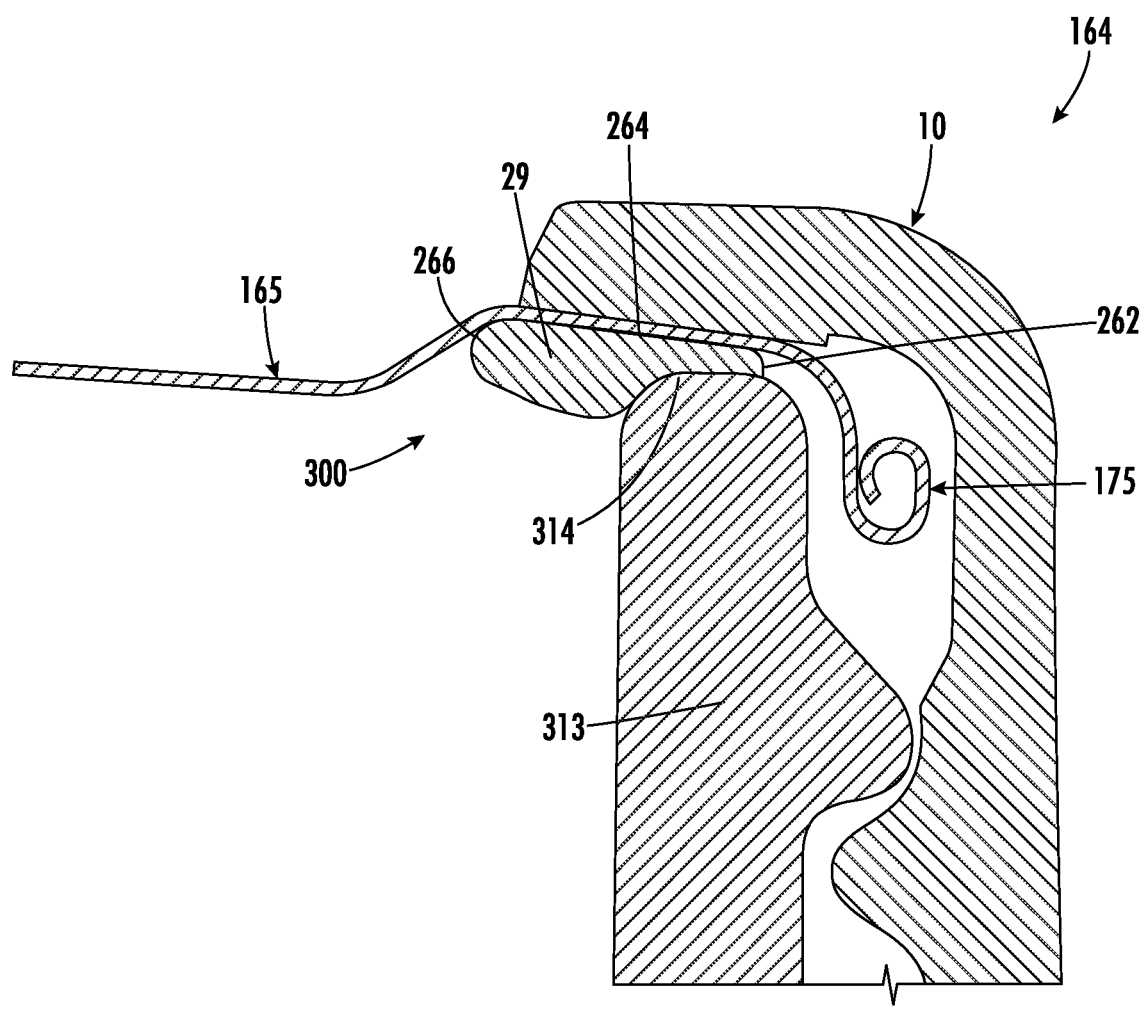
FIG. 29 is partial longitudinal cross-section view of the composite closure cap and sealing gasket of FIG. 26 with an alternative embodiment of the container shown in a tightened position.

Referring to FIG. 29 shows composite closure 164 in a tightened position, placing gasket 29 that previously had un-compressed cross-sectional shape 260 (see e.g., FIG. 26) in compressed conditions. End fit 314 of container 313 compresses gasket 29 making a compressed cross-sectional shape 300. Compressed cross-sectional shape 300 includes a curved edge 262 (formerly generally vertical) that extends into formerly generally horizontal edge 264 that now has a downward slope defined by surface 168, that extends into a now curved edge 266 that is partially defined by inclined surface 167. This curved portion 266 extends into another section that was previously at least partially curved portion 272. This section includes a different curvature than 266 and extends downward below end fit 314 before connecting to a sloped edge (previously at least partially 274) defined by end fit 314, and then connects back to curved edge 262.

Figure 30:
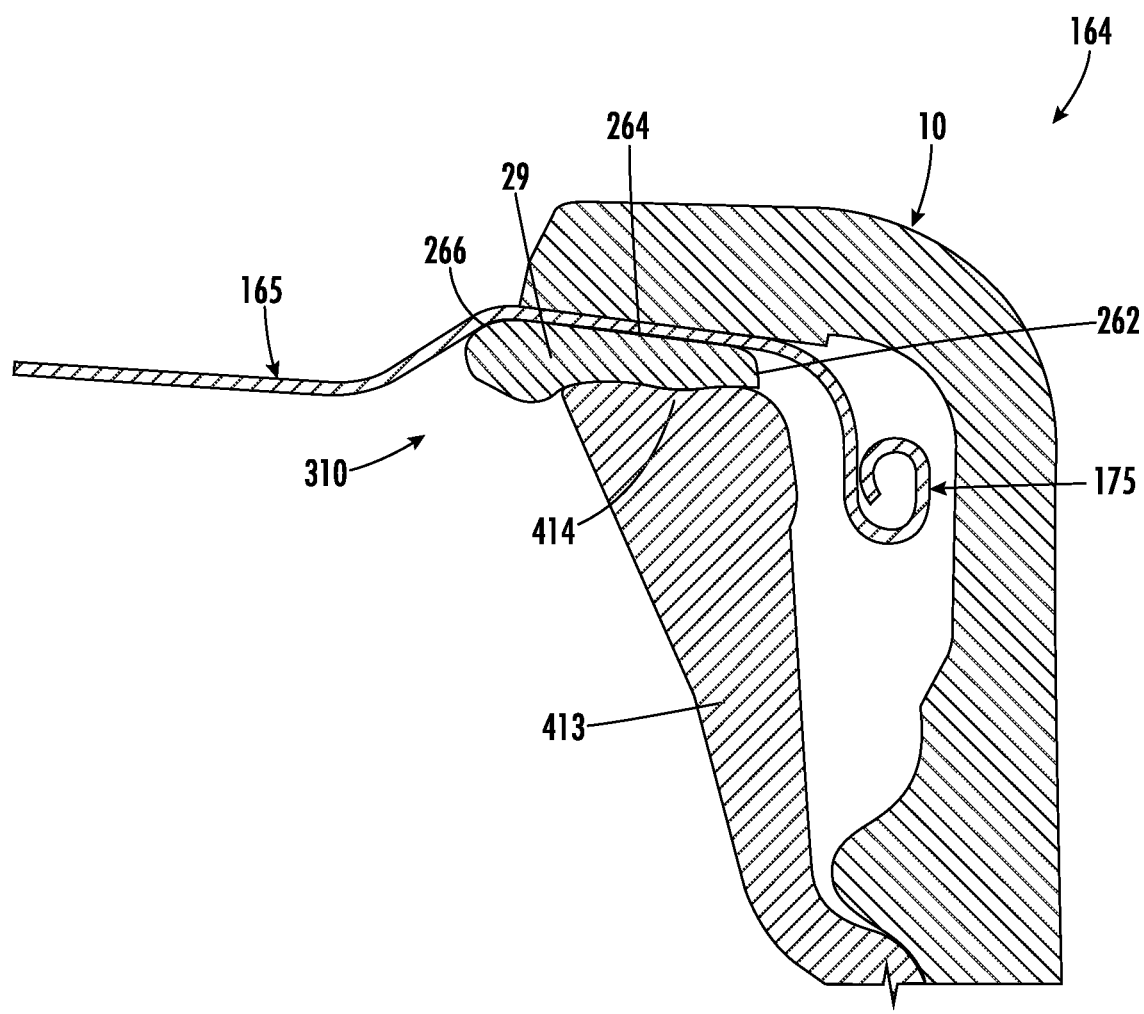
FIG. 30 is partial longitudinal cross-section view of the composite closure cap and sealing gasket of FIG. 26 with an alternative embodiment of the container shown in a tightened position.

Referring to FIG. 30 shows composite closure 164 in a tightened position, placing gasket 29 that previously had un-compressed cross-sectional shape 260 (see e.g., FIG. 26) in compressed conditions. End fit 414 of container 413 compresses gasket 29 making a compressed cross-sectional shape 310. Compressed cross-sectional shape 310 includes a curved edge 262 (formerly generally vertical) that extends into formerly generally horizontal edge 264 that now has a downward slope defined by surface 168, that extends into a now curved edge 266 that is partially defined by inclined surface 167. This curved portion 266 extends into another section that was previously at least partially curved portion 272. This section includes a different curvature than 266 and extends downward below end fit 414 before connecting to a sloped edge (previously at least partially 274) defined by end fit 414, and then connects back to curved edge 262.

Figure 31:
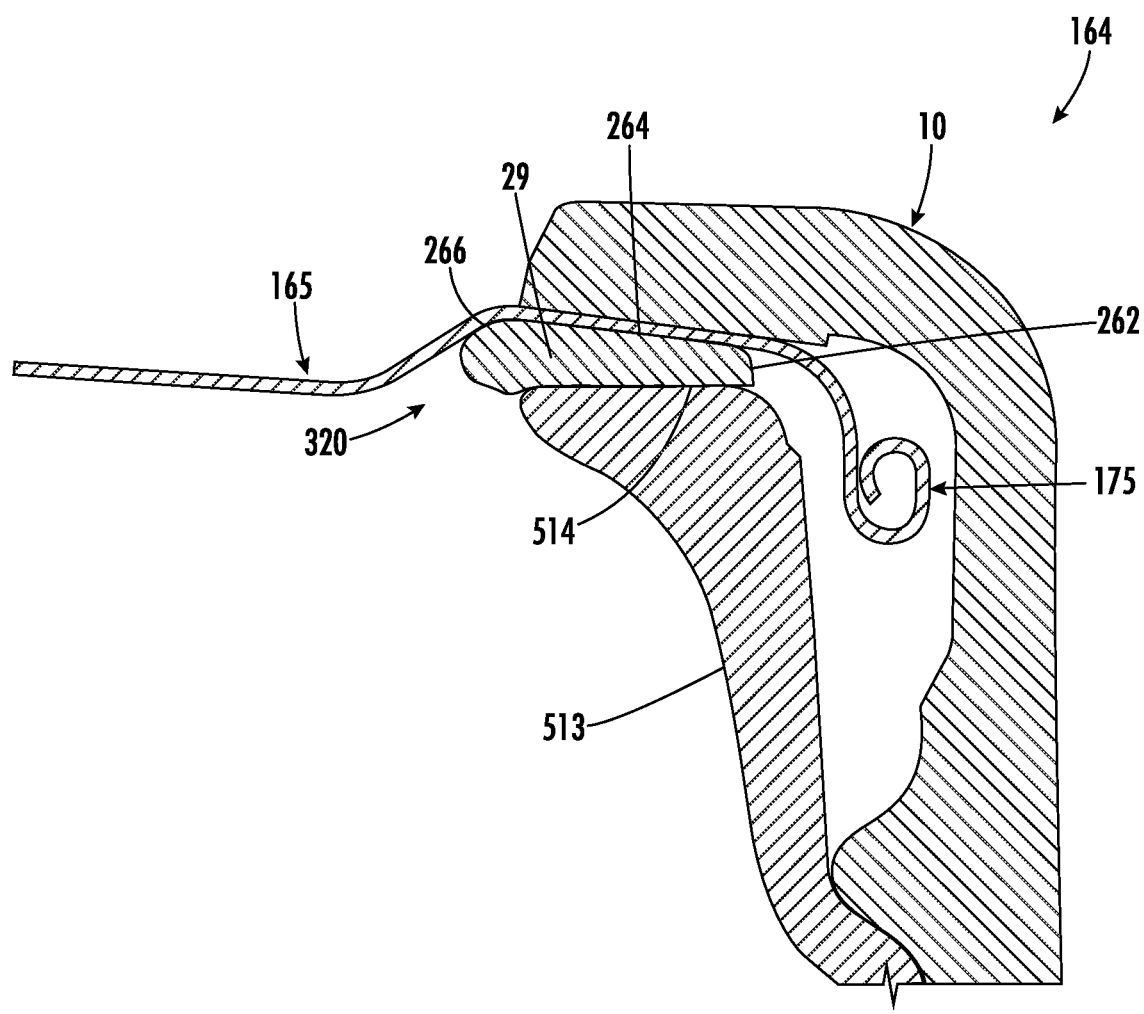
FIG. 31 is partial longitudinal cross-section view of the composite closure cap and sealing gasket of FIG. 26 with an alternative embodiment of the container shown in a tightened position.

Referring to FIG. 31 shows composite closure 164 in a tightened position, placing gasket 29 that previously had un-compressed cross-sectional shape 260 (see e.g., FIG. 26) in compressed conditions. End fit 514 of container 513 compresses gasket 29 making a compressed cross-sectional shape 320. Compressed cross-sectional shape 320 includes an curved edge 262 (formerly generally vertical) that extends into formerly generally horizontal edge 264 that now has a downward slope defined by surface 168, that extends into a now curved edge 266 that is partially defined by inclined surface 167. This curved portion 266 extends into another section that was previously at least partially curved portion 272. This section includes a different curvature than 266 and extends downward below end fit 514 before connecting to a sloped edge (previously at least partially 274) defined by end fit 514, and then connects back to curved edge 262.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A composite closure for a container, the composite closure comprising:
    a circular plastic fitment having a central opening defined by an inwardly extending circumferential flange and a downwardly depending skirt extending from the flange;
    an end panel received in the fitment, an upper, outer peripheral surface of the panel underlying a bottom surface of the flange and in intimate contact therewith when the composite closure is fully applied to a container;
    the skirt of the plastic fitment including a radially inwardly extending circumferential contact bead that includes a substantially non-deformable vertically flat surface in cross-section that is substantially parallel to a vertical axis of the closure and axially positioned for contact with a radial outermost surface of the end panel when the closure is fully applied to the container, the bead being sized so that the vertical contact surface thereof imparts a predetermined radial force on the radial outermost surface of the end panel which produces a perceptible resistance upon initial rotation of the closure from its fully applied state and provides assurance to a user that the composite closure has been fully applied to the container prior to the initial rotation; and
    an annular sealing gasket formed directly on the end panel to define a unitary integral fitment and gasket arrangement, the annular gasket having a ring shaped body, the gasket having a profile capable of forming a seal when the closure is applied to a container, wherein the gasket is composed of a non-PVC material and wherein the material comprises at least one type of rubbery block copolymer and a thermoplastic polymer.

2. The composite closure of claim 1 wherein the end panel is metal.

3. The composite closure of claim 2 wherein the radial outermost surface of the end panel includes an arcuate curl.

4. The composite closure of claim 3 wherein the bead is in the form of a plurality of circumferential individual segments.

5. The composite closure of claim 4 wherein the segments are uniformly spaced around the inner circumference of the plastic fitment.

6. The composite closure of claim 1 wherein the circular plastic fitment is composed of a propylene polymer.

7. The composite closure of claim 1 wherein the initial rotation produces a disengagement of the contact bead from the radial outermost surface of the end panel.

8. The composite closure of claim 1 wherein the gasket materials have a Shore A hardness between 30 and 100 and a compression set between 30% and 95% in a compression test similar to ASTM D 395-97, method B after 22 h at 70° C.

9. A composite closure and container package, comprising:
    a container having a neck with container threads formed on an outer surface thereof, the neck including an end surface defining an open mouth of the container;
    a circular plastic fitment having a central opening therein defined by an inwardly extending circumferential flange and a depending skirt extending downwardly from the flange;
    a circular end panel received in the plastic fitment, the end panel including circumferential, downwardly facing channel in which a resilient composition is contained for forming a seal with the end surface of the container neck;
    an upper, outer peripheral surfaces of the end panel underlying the flange which is in intimate contact with a bottom surface thereof when the composite closure is fully applied to the container, the outer peripheral edge of the end panel terminating in an arcuate curl;
    the skirt of the plastic fitment including a radially, inwardly extending circumferential bead that includes a substantially non-deformable, vertically flat surface in cross-section that is substantially parallel to a vertical axis of the container and axially positioned for contact with the curl, the flat vertical surface of the bead being in its as-molded shape, without deformation as a result of its contact with the curl;
    the bead being sized and configured so that the flat vertical surface of the bead imparts selected predetermined radial force which imparts a perceptible resistance upon initial rotation of the closure while fully applied to the container so as to provide a user with assurance upon rotation of the closure that it was fully applied to the container prior to the initial rotation; and
    an annular sealing gasket formed directly on the end panel to define a unitary integral fitment and gasket arrangement, the annular gasket having a ring shaped body, the gasket having a profile capable of forming a seal when the closure is applied to a container, wherein the gasket is composed of a non-PVC material and wherein the material comprises at least one type of rubbery block copolymer.

10. The composite closure and container package of claim 9 wherein the bead is in the form of a plurality of circumferential space-apart individual segments.

11. The composite closure and container package of claim 10 wherein the individual bead segments are generally uniformly spaced around the inner circumference of the plastic fitment.

12. The composite closure and container package of claim 9 wherein the circular plastic fitment is composed of a propylene polymer.

13. The composite closure and container package of claim 9 wherein perceptible resistance upon initial rotation of the closure produces a disengagement of the contact bear from the curl of the end panel.

14. The composite closure of claim 1, wherein the gasket has an uncompressed cross-sectional shape including a generally rectangular portion connected to a curved end.

15. The composite closure of claim 1, wherein the gasket has a volume between 0.01 in$^3$ to 0.05 in$^3$.

16. The composite closure and container package of claim 9, wherein a cross-sectional shape of the gasket is defined by a curved edge that extends into and connects to a generally horizontal edge, the generally horizontal edge extends into and connects to a generally vertical edge, the generally vertical edge extends into and connects to a generally horizontal connecting edge that extends and connects to the curved edge.

17. The composite closure and container package of claim 9, wherein the gasket has a weight of about 47 grams.

* * * * *